United States Patent
Noble et al.

(10) Patent No.: US 12,403,531 B2
(45) Date of Patent: Sep. 2, 2025

(54) RADIATION SOURCE ASSEMBLY AND APPARATUS FOR LAYER-BY-LAYER FORMATION OF THREE-DIMENSIONAL OBJECTS

(71) Applicant: STRATASYS POWDER PRODUCTION LTD., London (GB)

(72) Inventors: Christopher Noble, London (GB); Adam Ellis, London (GB); George Darmanin, London (GB)

(73) Assignee: Stratasys Powder Production Ltd., Nottingham (GB)

( * ) Notice: Subject to any disclaimer, the term of this patent is extended or adjusted under 35 U.S.C. 154(b) by 725 days.

(21) Appl. No.: 17/616,979

(22) PCT Filed: Jun. 5, 2020

(86) PCT No.: PCT/GB2020/051367
§ 371 (c)(1),
(2) Date: Dec. 6, 2021

(87) PCT Pub. No.: WO2020/245600
PCT Pub. Date: Dec. 10, 2020

(65) Prior Publication Data
US 2022/0241867 A1 Aug. 4, 2022

(30) Foreign Application Priority Data
Jun. 7, 2019 (GB) ..................................... 1908186

(51) Int. Cl.
*B29C 64/277* (2017.01)
*B22F 10/28* (2021.01)
(Continued)

(52) U.S. Cl.
CPC ............... *B22F 12/45* (2021.01); *B22F 10/28* (2021.01); *B22F 12/13* (2021.01); *B22F 12/42* (2021.01);
(Continued)

(58) Field of Classification Search
CPC .......... B22F 12/45; B22F 12/42; B22F 12/13; B22F 10/28; B29C 64/188; B29C 64/295; B29C 64/277
See application file for complete search history.

(56) References Cited

U.S. PATENT DOCUMENTS

2003/0052105 A1 3/2003 Nagano et al.
2003/0214571 A1 11/2003 Ishikawa et al.
(Continued)

FOREIGN PATENT DOCUMENTS

WO 1998051464 A1 11/1998
WO 2003085457 A1 10/2003
(Continued)

*Primary Examiner* — Alison L Hindenlang
*Assistant Examiner* — Erica Hartsell Funk
(74) *Attorney, Agent, or Firm* — Honigman LLP; Eric J. Sosenko; Jonathan P. O'Brien

(57) ABSTRACT

A radiation source assembly (100) for an apparatus (110) for layer-by-layer formation of a three-dimensional object by the consolidation of particulate material, the radiation source assembly (100) comprising: a plurality of radiation sources (21), each radiation source (21) being operable to emit a respective beam of radiation (26) towards a build bed surface (12) of the apparatus (110); and one or more collimators (22) arranged to collimate the beams of radiation (26) to produce one or more collimated beams of radiation (27) and to direct said collimated beams (27) of radiation towards the particulate material on the build bed surface (12).

18 Claims, 15 Drawing Sheets

(51) Int. Cl.
*B22F 12/13* (2021.01)
*B22F 12/42* (2021.01)
*B22F 12/45* (2021.01)
*B29C 64/188* (2017.01)
*B29C 64/295* (2017.01)
*B33Y 10/00* (2015.01)
*B33Y 30/00* (2015.01)
*B33Y 40/10* (2020.01)

(52) U.S. Cl.
CPC .......... *B29C 64/188* (2017.08); *B29C 64/277* (2017.08); *B29C 64/295* (2017.08); *B33Y 10/00* (2014.12); *B33Y 30/00* (2014.12); *B33Y 40/10* (2020.01)

(56) References Cited

U.S. PATENT DOCUMENTS

| | | |
|---|---|---|
| 2014/0255666 A1 | 9/2014 | Stucker et al. |
| 2017/0355137 A1 | 12/2017 | Ederer et al. |
| 2017/0361530 A1 | 12/2017 | Liu |
| 2017/0368748 A1* | 12/2017 | De Pena ................. B33Y 50/02 |

FOREIGN PATENT DOCUMENTS

| | | | | |
|---|---|---|---|---|
| WO | WO-2016201309 A1 * | 12/2016 | ............. | B22F 10/00 |
| WO | 2017184136 A1 | 10/2017 | | |
| WO | 20180140218 A1 | 8/2018 | | |
| WO | 20190089007 A1 | 5/2019 | | |

\* cited by examiner

RADIATION SOURCE ASSEMBLY AND APPARATUS FOR LAYER-BY-LAYER FORMATION OF THREE-DIMENSIONAL OBJECTS

CROSS REFERENCE TO RELATED APPLICATIONS

This application is the U.S. national phase of PCT Application No. PCT/GB2020/05167, filed on Jun. 5, 2020, which claims priority to GB 1908186.8 filed Jun. 7, 2019, the disclosures of which are herein incorporated by reference in their entirety.

FIELD OF THE INVENTION

The present disclosure relates to a radiation source assembly for an apparatus for the layer-by-layer formation of three-dimensional (3D) objects from particulate material, and to the operation of such a radiation source assembly within the apparatus. The radiation source assembly may be particularly suitable for particulate material bed applications that require reliable control of the temperature and location of the heating of the particulate material within the apparatus.

BACKGROUND

Processes used to make three-dimensional objects from particulate material, such as Laser Sintering or High Speed Sintering, are receiving increased interest as they move towards faster throughput times and become industrially viable. In these processes, the object is formed layer-by-layer from successive layers of particulate material that are distributed across a work surface. The work surface comprises a build bed surface and such processes involve applying heat to successively precondition (or pre-heat) and consolidate (fuse, melt or sinter) particulate material that is distributed to form a layer on the build bed surface. Each layer of particulate material is consolidated over defined regions of the build bed surface in accordance with image data in order to form a 'slice' of the three-dimensional object. The build bed is then lowered, a new layer of particulate material is distributed across the work surface, and the process is repeated.

Ensuring reliable and controllable heating of the distributed layers plays an important role in determining the quality of the finished object. For example, preferably there should be no variations in heating of the particulate layer that affect the integrity, or undesirably vary the properties, of the 'slice' that is being formed. Control of the temperature of the particulate material surface is important for a variety of reasons, such as ensuring controlled temperature conditions across the entire build bed surface, and from layer to layer, so as to avoid undesirable consolidation conditions, such as "curl" where consolidated material moves out of the plane of the build surface as the build cake cools down. It is therefore necessary to control the intensity and duration of the heating of the particulate material, whilst ensuring that the amount of heat provided to the layer is sufficient to consolidate the particulate material in the desired areas.

Laser Sintering, which may use polymeric or metal powders, uses a laser to trace the shape of a slice of the three-dimensional object in the particulate material, sintering the particulate layer. Another layer of particulate material is then deposited and the shape of the next slice of the object is traced by the laser, and so on, to fabricate a three-dimensional object. A similar process using an electron beam may be used to fuse particulate material such as metal powders (Electron Beam Sintering).

In contrast to Laser Sintering or Electron Beam Sintering, where the energy source is required to trace the shape of the object in each layer of particulate material, a High Speed Sintering process may be used. In this process a radiation absorbing material (RAM) is deposited in the shape of each slice of the three-dimensional object onto the layer of particulate material, in one or more passes of a droplet deposition head or array of droplet deposition heads (such as printheads). Then, each layer is irradiated with a radiation source, for example an infrared light, across the entire build bed surface, such that only particulate material to which the RAM has been applied is consolidated to form the slice.

Currently in High Speed Sintering processes a combination of fixed heaters (generally overhead heaters such as ceramic heaters) above the build bed surface and lamps mounted on a movable sled system (scanning lamps) are widely used. The scanning lamps are generally infra-red (IR) emitting and are switched ON prior to the pass and remain ON during the entire pass over the build bed surface. This scanning pass may be done to pre-heat the particulate material and/or to consolidate it. Such an arrangement is undesirable for a number of reasons: firstly because it uses a lot of power (lamp power between 1 kW to 3 kW for consolidating and for pre-heating), and secondly because the entire build bed surface is heated to a near consolidation temperature. This can cause the particulate material that has not had RAM deposited on it to become harder, and consequently "de-caking" (removal of the excess particulate material from the formed part) can become difficult. A hard "cake" can make post processing of the formed parts arduous, by requiring significant manual labour. This in turn leads to increased part cost, e.g. due to longer turnaround time/higher labour time. A further undesirable side-effect of the generalised heating is that the unconsolidated particulate material degrades at a faster rate than if it had not been heated to such high temperatures. The reduction in particulate material quality reduces its suitability for re-use (unused particulate material is generally recycled in the apparatus) and can thus make the 3D printing process more expensive.

It is an object of the present invention to improve processes for the layer-by-layer formation of three-dimensional (3D) objects from particulate material, such as the High Speed Sintering process, to ensure more reliable and consistent control of the pre-heating and consolidation steps so as to overcome the above described disadvantages.

SUMMARY

Aspects of the invention are set out in the appended independent claims, while details of particular embodiments of the invention are set out in the appended dependent claims.

According to a first aspect of the disclosure there is provided a radiation source assembly for an apparatus for the layer-by-layer formation of a three-dimensional object by the consolidation of particulate material, the radiation source assembly comprising: a plurality of radiation sources, each radiation source being operable to emit a respective beam of radiation towards a build bed surface of the apparatus; and one or more collimators arranged to collimate the beams of radiation to produce one or more collimated beams of radiation and to direct said collimated beams of radiation towards the particulate material on the build bed surface.

According to certain embodiments the radiation source assembly further comprises one or more focusing lenses arranged to focus the collimated beams of radiation onto the particulate material on the build bed surface, wherein said one or more collimators are arranged between the radiation sources and the focusing lenses.

According to certain embodiments, one or more radiation source assemblies according to the first aspect of the disclosure may be controllable so as to provide targeted pre-heating and/or consolidation of particulate material on the build bed surface.

According to certain embodiments, one or more radiation source assemblies according to the first aspect of the disclosure may be controllable so as to alter the focus, spot size, intensity, duty cycle or wavelength of the beams of radiation.

According to a second aspect of the disclosure there is provided an apparatus for the layer-by-layer formation of a three-dimensional object by the consolidation of particulate material, the apparatus comprising one or more radiation source assemblies according to the first aspect of the disclosure, for pre-heating and/or consolidating the particulate material on the build bed surface.

According to a third aspect of the disclosure there is provided a method for manufacturing a three-dimensional object from a particulate material using a radiation source assembly according to the first aspect of the disclosure.

According to a fourth aspect of the disclosure there is provided a radiation system controller operable to cause the radiation source assembly according to the first aspect of the disclosure to carry out the method according to the third aspect of the disclosure.

The present disclosure also provides a fixed pre-heater or pre-heater array above the build bed surface for use with any of the above aspects of the disclosure to provide targeted and controllable pre-heating of selected portions of the particulate material on the build bed surface.

BRIEF DESCRIPTION OF THE DRAWINGS

Embodiments will now be described with reference to the accompanying Figures of which:

FIG. 3b, depicts a process for deposition and consolidation utilising the scanning sled layout illustrated in FIG. 3a;

Figure 1A:
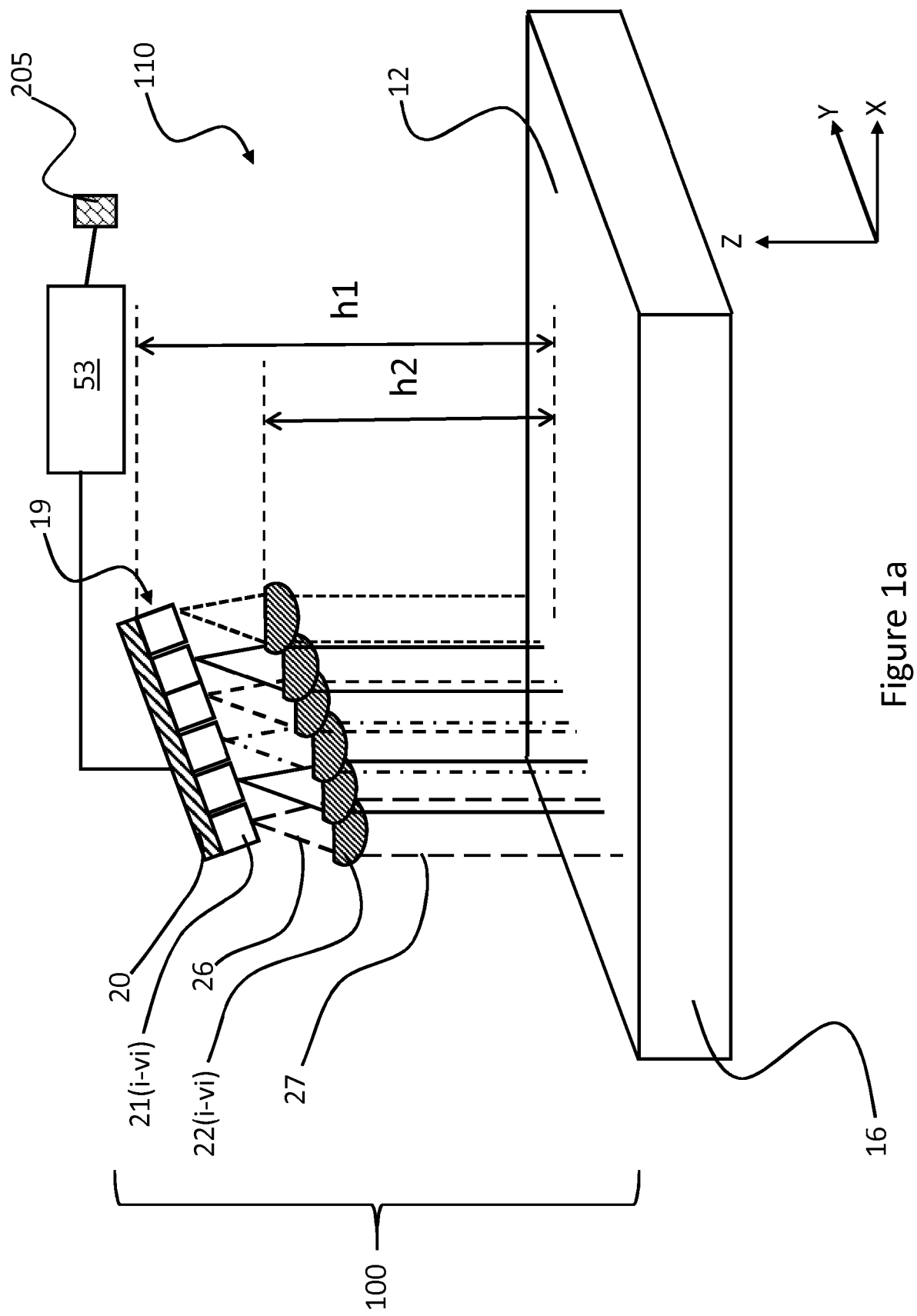
FIG. 1a is a schematic diagram of a perspective view of a radiation source assembly for an apparatus for manufacturing a three-dimensional object, comprising one or more collimators.

It should be noted that the drawings are not to scale and that certain features may be shown with exaggerated sizes so that these are more clearly visible.

DETAILED DESCRIPTION

Embodiments and their various implementations will now be described with reference to the drawings. Throughout the following description, like reference numerals are used for like elements where appropriate.

FIG. 1a is a schematic diagram of a perspective view of a radiation source assembly 100 for an apparatus 110 for manufacturing a three-dimensional object, comprising one or more collimators 22. More particularly, FIG. 1a shows a radiation source assembly 100 for an apparatus 110 for manufacturing a three-dimensional object by the consolidation of particulate material. Further details of the apparatus 110 are depicted in FIG. 2. As can be seen in FIG. 1a, the radiation source assembly 100 comprises a plurality of radiation sources 21(i-vi), each radiation source 21 being operable to emit a respective beam of radiation 26 towards a build bed surface 12 of the apparatus 110 for pre-heating and/or consolidating particulate material; and a plurality of collimators 22(i-vi) arranged between the plurality of radiation sources 21(i-vi) and the build bed surface 12 so as to collimate the beams of radiation 26 to produce collimated beams of radiation 27 and to direct said collimated beams of radiation 27 towards the particulate material on the build bed surface 12. The use of collimator(s) may be advantageous because collimating the beams 26 emitted by the plurality of radiation sources 21(i-vi) may reduce or eliminate beam diversion and reduce the likelihood of overlap of beams from different radiation source(s) 21. Such overlap is undesirable because it means that some regions of the build bed surface 12 may receive more radiation energy than others, leading to 'hot' and 'cold' spots and potentially causing uneven formation of a three dimensional object.

It is further advantageous to collimate the beams 26 as this arrangement provides greater flexibility in positioning the radiation source assembly 100 such that it can be moved further from the build bed surface 12 and reduces the likelihood of undesirable heating of the radiation source assembly 100 by heat reflected from the build bed surface 12. Additionally, moving the radiation source assembly 100 further away from the build bed surface 12 may reduce the amount of loose particulate material that settles on (and possibly adheres to) said assembly, thereby extending its life or reducing the number of cleaning operations required.

Moreover, in order to fine tune the design and operation of the radiation source assembly 100 it may be desirable to be able to alter the position of the plurality of radiation sources 21(i-vi). As can be seen in FIG. 1a the radiation source assembly 100 is located above the build bed surface 12 in the Z-direction and arranged so as to span the build bed 16 in the Y-direction. The plurality of radiation sources 21(i-vi) are located above the build bed surface 12 at a distance h1 in the Z-direction and mounted to a radiation source array holder 20. In some implementations, the distance h1 of the radiation sources 21(i-vi) from the build bed surface 12 may be adjustable. The collimators 22(i-vi) are located above the build bed surface 12 at a distance h2 in the Z-direction and may be mounted in any suitable manner so as to collimate the beams of radiation 26 such that the collimated beams 27 impinge upon the build bed surface 12.

Further it may be desirable to be able to alter the position above the build bed surface 12 of the one or more collimators 22, either in tandem with, or independently of the plurality of radiation sources 21(i-vi), in order to fine tune the design and operation of the radiation source assembly 100. The distance h2 of the one or more collimators 22 from the build bed surface 12 may be adjustable. In some embodiments, it may be desirable to be able to individually alter the position of each individual collimator 22(i-vi).

The radiation source assembly 100 may comprise one or more collimators 22. FIG. 1a depicts a plurality of collimators 22(i-vi) which comprise collimating lenses. The one or more collimating lenses may be spherical lenses. There are also present a plurality of radiation sources 21(i-vi) such that there is a respective collimator 22 for each of the plurality of radiation sources 21(i-vi), but this 1:1 relationship is not essential and other implementations may be used. An arrangement with collimators and radiation sources as per FIG. 1a may be suitable for pre-heating, but in some embodiments it may also be suitable for consolidating particulate material on the build bed surface 12. In some implementations, there may be one collimator 22 for all the radiation sources 21, and in still further implementations the plurality of radiation sources 21(i-vi) may be arranged into a plurality of individually addressable groups and there may be a respective collimator 22 for each of the plurality of groups of radiation sources 21, or any other ratio or combination of collimators 22 and radiation sources 21 as may be suitable.

As FIG. 1a shows, the radiation source assembly 100 comprises a plurality of radiation sources 21(i-vi) which, in this instance, are arranged in a radiation source array 19 as a single row. In other implementations, the radiation source array 19 may comprise a plurality of rows of radiation sources 21 so as to form a multi-row array, or grid. Such an arrangement may enable more of the build bed surface 12 to be addressed at once, which may be beneficial for uniform heating and for speed of object formation. In some implementations, the radiation source assembly 100 may comprise a radiation source array 19 where the rows of radiation sources 21 are arranged in a staggered manner. Such a staggered arrangement may be beneficial to ensure thorough and consistent heating of the build bed surface 12. Any suitable or practicable stagger pattern may be used.

FIG. 1a additionally depicts a radiation system controller 53 which controls the radiation source assembly 100 in accordance with image data for the three-dimensional object so as to switch the radiation sources 21 ON or OFF as they are moved over the build bed surface 12, such that individual radiation sources are individually addressable and/or controllable. Alternatively, the plurality of radiation sources 21(i-vi) may be arranged into a plurality of individually addressable groups and sub-groups, such that the radiation system controller 53 provides signals to control the individual groups and/or sub-groups independently from one another. For example, individual radiation sources 21 or groups/sub-groups of radiation sources 21 may be switched ON/OFF depending on image data and/or manufacturing data supplied to the radiation system controller 53 that indicates the locations on the build bed surface 12 which require a pre-heat step or a consolidation step. Further, the individual radiation sources 21 or groups/sub-groups of radiation sources 21 may be operated to produce different intensities of radiation at the build bed surface 12 depending on whether the radiation source assembly 100 is being used for a pre-heating or consolidation step. Still further, the intensity of radiation emitted by the radiation source assembly 100 or individual radiation sources 21 or groups/sub-groups of radiation sources 21 may optionally be controlled in response to measurements of the temperature of the build bed surface 12, for example so that hotter regions of the build bed surface are pre-heated or consolidated as desired without being over-heated. Such measurements could be made, for instance, by an optional temperature sensor 205 such as a thermal camera, or pyrometer, located above the build bed surface 12, or by some other suitable measurement device or method.

In some implementations, in addition to/instead of altering the intensity of the radiation being emitted by the radiation sources 21, the wavelength of the radiation may be altered depending on whether a pre-heating or consolidation step is being performed, or in response to measurements of the temperature of the build bed surface 12. This may be achieved by, for example, having groups or sub-groups comprising different types of radiation sources 21 within the radiation source assembly 100, for example different types of light emitting diodes (LEDs) that emit different wavelengths, laser diodes, monochromatic lamps. Another suitable radiation source 21 could be one or more infrared sources coupled with one or more digital mirror devices (DMDs).

Figure 1B:
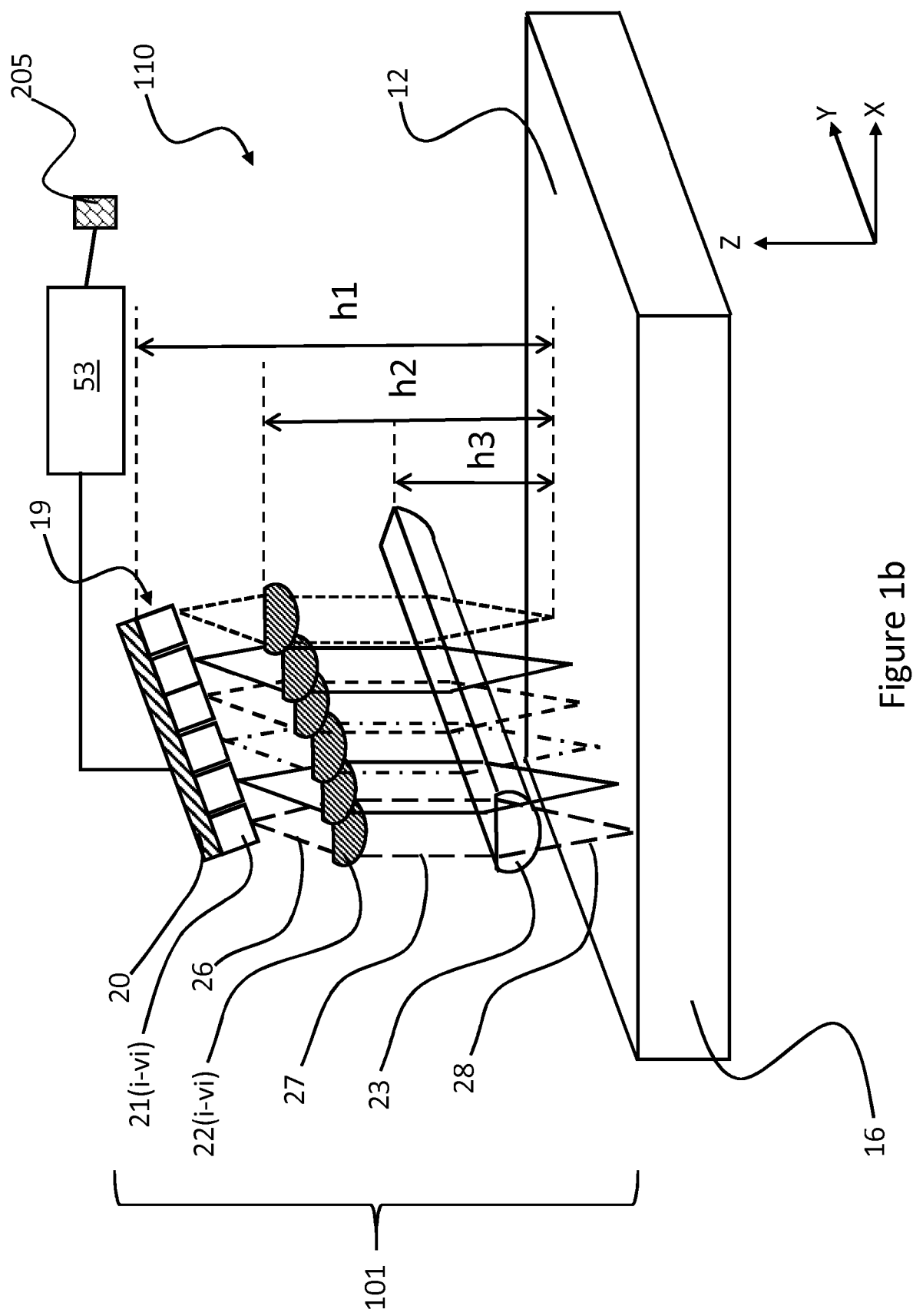
FIG. 1b is a schematic diagram of a perspective view of another radiation source assembly for an apparatus for manufacturing a three-dimensional object, comprising a focusing lens array and one or more collimators.

Turning now to FIG. 1b, this is a schematic diagram of a perspective view of another radiation source assembly 101 for an apparatus for manufacturing a three-dimensional object. FIG. 1b comprises many features depicted in the apparatus of FIG. 1a, and like reference numerals have been used for like elements where appropriate. As can be seen, such a radiation source assembly 101 comprises one or more collimators 22(i-vi) and further comprises a common (i.e. shared) focusing lens 23. The one or more collimators 22(i-vi) are arranged between the radiation sources 21(i-vi) and the focusing lens 23 so as to collimate the beams of radiation 26 to produce a plurality of collimated beams 27. The focusing lens 23 is arranged to focus the collimated beams 27 into focused beams 28 which are arranged to be focused onto particulate material on the build bed surface 12.

In some implementations, the focusing lens 23 may instead be one or more focusing lenses 23 which may be arranged in an array, for example as a row or rows to form an array of focusing lenses 23. Further, in some implementations the focal length(s) of the one or more focusing lenses 23 may be adjustable and/or the spot size(s) may be adjustable.

For example, a method of operating the radiation source assembly 101 may involve controlling the one or more focusing lenses 23 to adjust their focal length in order to focus and de-focus the beams 28, and/or to alter the spot size. This method may be used to alter the amount of heat supplied to an area of the build bed surface 12. This might be desirable in order to switch between temperatures suitable for pre-heating and those suitable for consolidation. It may also be desirable to be able to fine-tune the energy supplied to the particulate material in response to temperature measurements, for example, by altering how tightly the beams 28 are focused and hence the spot size and therefore energy supplied per unit area to particulate material on the build bed surface 12.

The one or more focusing lenses 23 are located at a distance h3 from the build bed surface 12, which in some implementations may be adjustable. In some implementations, it may be desirable to alter the distances h1, h2 and h3 independently of each other such that the distance h1 of the radiation sources 21 from the build bed surface 12 and the distance h2 of the one or more collimators 22 and the distance h3 of the one or more focusing lenses 23 from the build bed surface 12 may be independently adjustable.

Since the plurality of radiation sources 21(i-vi) may be individually addressable and controllable, in some implementations the intensity of the radiation being emitted and/or the wavelength of the radiation being emitted by individual radiation sources 21 and/or the duty cycle of the plurality of radiation sources 21(i-vi) may be controlled and a method of operation of the radiation source assembly 101 may involve controlling these features/parameters.

In some implementations, the focal length and/or the spot size on the build bed surface may be altered and controlled by adjusting the one or more focusing lenses 23 in any manner that is suitable to achieve the desired temperature at the build bed surface 12 for the pre-heating or consolidation of a three-dimensional object. For example the duty cycle may be controlled to alter the length of time that the radiation sources 21 are switched ON in response to overall temperature changes in the apparatus 110, or to select which groups or sub-groups of radiation sources 21 are switched ON. Further, in some implementations, the focal length(s) of the one or more focusing lenses 23 may be individually adjusted to control the intensity of the focused beams 28 on the build bed surface 12, and/or to alter the spot size. The one or more focusing lenses 23 may also be arranged into one or more groups or sub-groups that may correspond to one or more of the groups or sub-groups of radiation sources 21 such that the controller 53 can control the focal length or spot size of a group or sub-group of radiation sources. FIG. 1b shows one focusing lens 23 to a row of radiation sources 21(i-vi) but it may be understood that this is in no way limiting and in other implementations any suitable configuration of focusing lenses and radiation sources may be used.

A method of operation of the radiation source assembly 101 depicted in FIG. 1b may therefore involve arranging the plurality of radiation sources 21(i-vi) into a plurality of individually addressable groups, each group comprising one or more of the plurality of radiation sources 21(i-vi). The method may therefore involve controlling the intensity of the radiation being emitted and/or the wavelength of the radiation being emitted and/or the spot size and/or the duty cycle of the group of radiation sources 21. For example, the radiation source assembly 100/101 may comprise different types of LEDs, operable to emit different wavelengths of radiation, and the method may involve arranging each type of LED into a separately controllable group or sub-group and choosing which group/sub-group to switch ON depending on whether pre-heating or consolidation steps are being performed. Further, the method of operation may involve altering the focal length of the one or more focusing lenses 23 so as to alter the intensity of the focused beams 28 at the build bed surface 12, or to alter the spot size at the build bed surface 12.

Figure 1C:
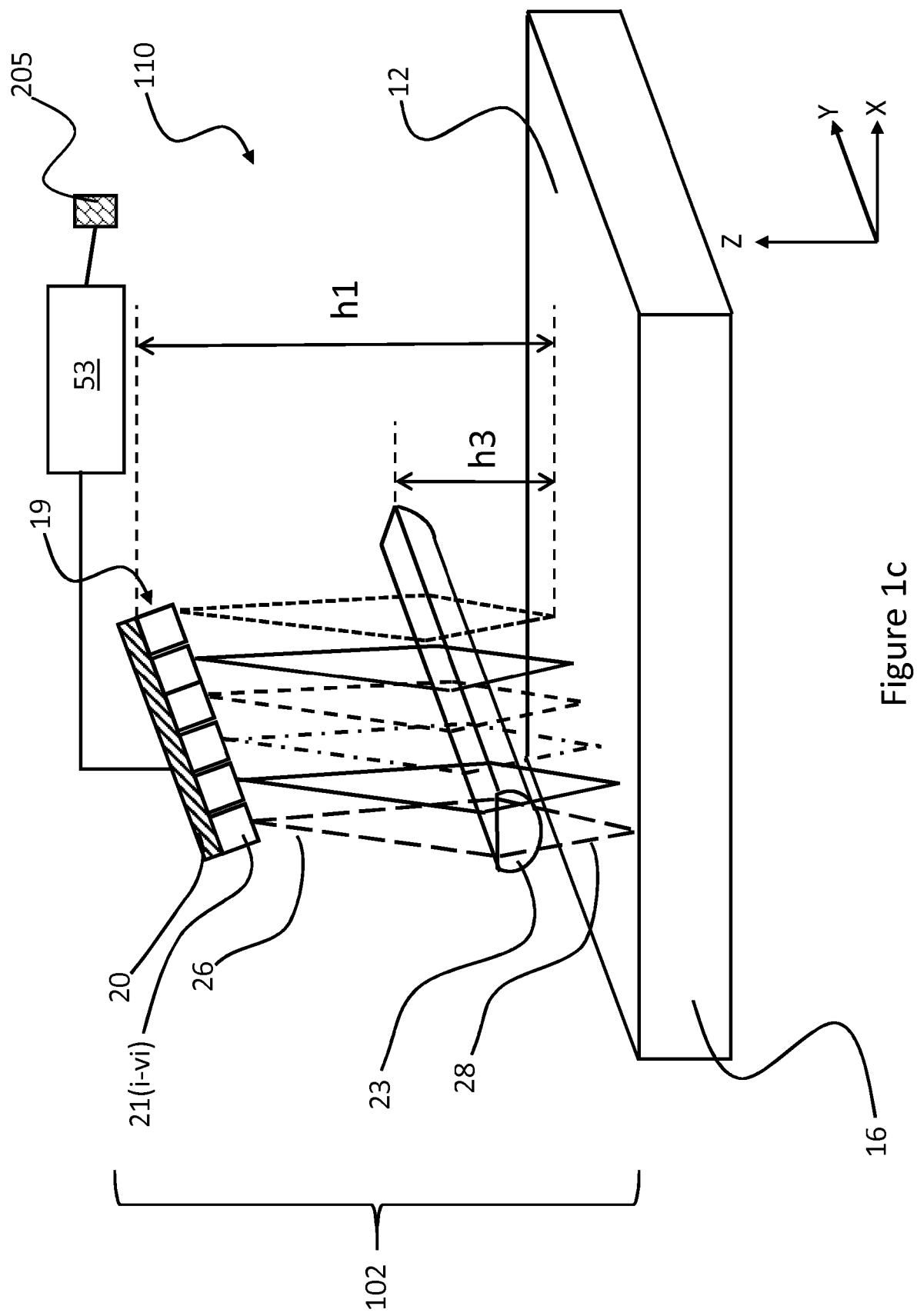
FIG. 1c is a schematic diagram of a perspective view of another radiation source assembly for an apparatus for manufacturing a three-dimensional object, comprising one or more focusing lenses.

FIG. 1c is a schematic diagram of a perspective view of a radiation source assembly 102 for an apparatus 110 for manufacturing a three-dimensional object according to a variant comprising a common (i.e. shared) focusing lens 23, as in FIG. 1b, but without the one or more collimators. FIG. 1c comprises many features depicted in the embodiments of FIGS. 1a and 1b, and like reference numerals have been used for like elements where appropriate. More particularly, FIG. 1c shows a radiation source assembly 102 for an apparatus 110 for manufacturing a three-dimensional object by the consolidation of particulate material. As can be seen in FIG. 1c, the radiation source assembly 102 comprises a plurality of radiation sources 21(i-vi) and a common focusing lens 23 arranged to focus a plurality of beams of radiation 26 into focused beams 28 which are focused onto particulate material on the build bed surface 12. In other implementations, the focusing lens 23 may instead be one or more focusing lenses 23 which may be arranged in a row or rows to form an array of focusing lenses 23.

Figure 2A:
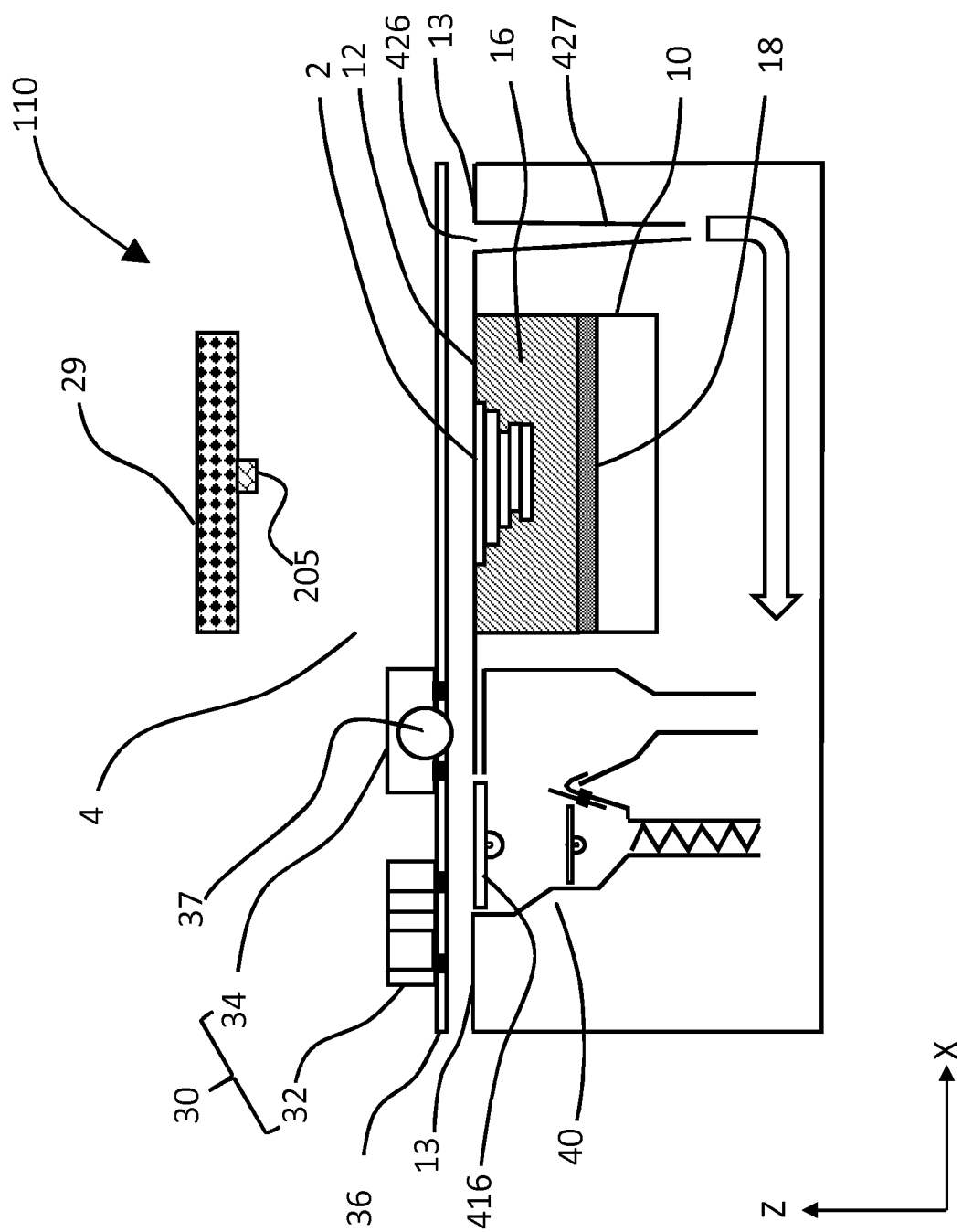
FIG. 2a is a schematic diagram of a cross-section through an apparatus for the layer-by-layer formation of three-dimensional objects by the consolidation of particulate material.
Figure 2B:
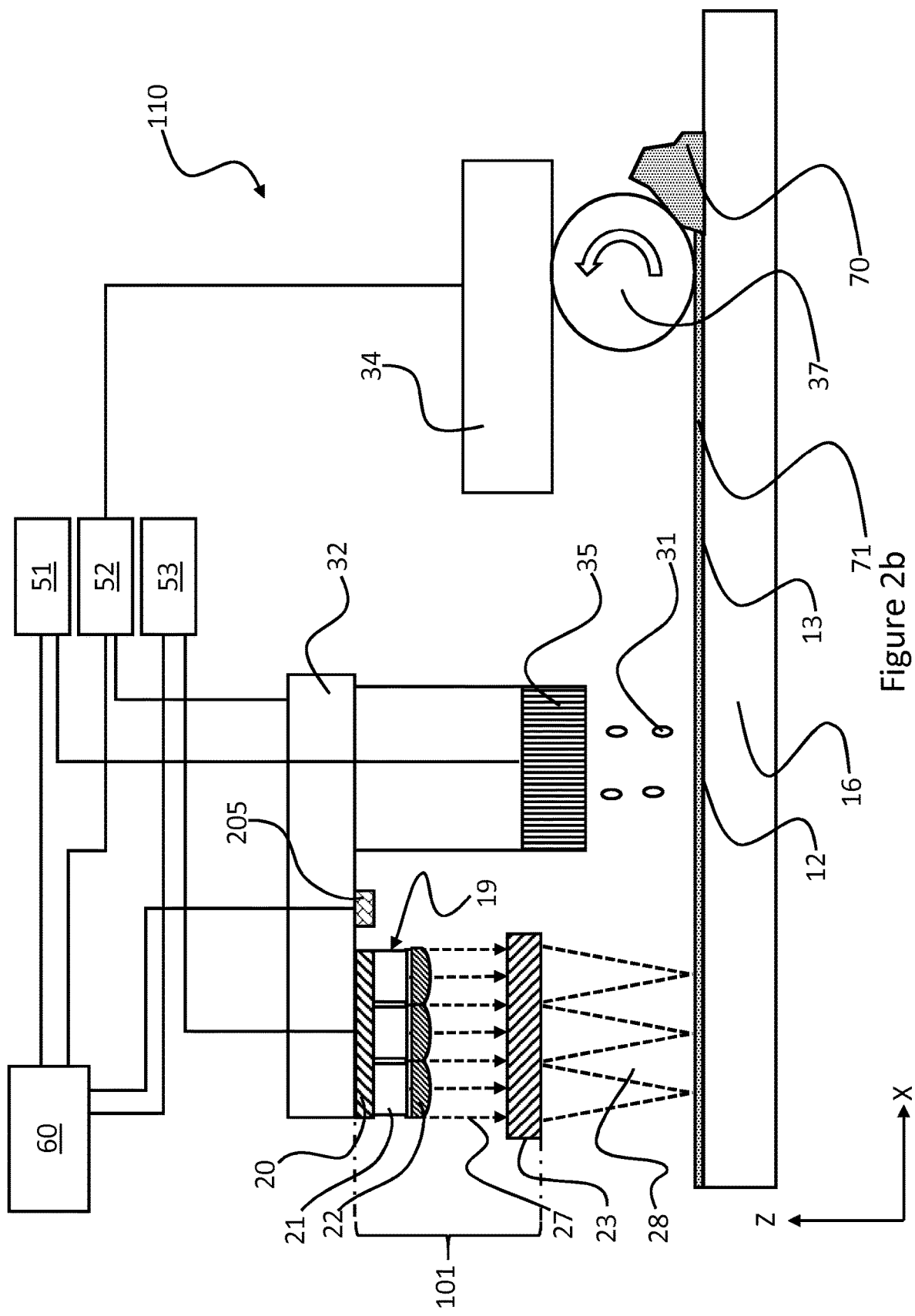
FIG. 2b is a schematic diagram of a cross-section through a portion of the apparatus depicted in FIG. 2a incorporating a radiation source assembly similar to that depicted in FIG. 1b.

Turning now to FIGS. 2a and 2b, FIG. 2a is a schematic diagram of a cross-section through an apparatus 110 for manufacturing a three-dimensional object from a particulate material, comprising one or more radiation source assemblies 100/101/102 as described in FIGS. 1a-c, that are mounted to a sled system 30, for pre-heating and/or consolidating particulate material on the build bed surface 12. The apparatus 110 further comprises a work surface 13, which comprises the build bed surface 12 and a working space 4 in which the sled system 30, comprising sleds 32 and 34, an (optional) overhead fixed heater 29, and a build bed 16 are arranged. The build bed surface 12 is contiguous with the work surface 13 and forms the uppermost level of the build bed 16 in the Z-direction. The work surface 13 is the surface onto which particulate material is dosed from the particulate material dosing system 40. The apparatus 110 therefore further comprises a particulate material dosing system 40 which comprises a dosing device 416 for depositing particulate material onto the work surface 13. The dosing device 416 may be a dosing blade, for example.

The build bed 16 and the formed part of the three-dimensional object 2 are supported inside a build chamber 10, in which the build bed 16 is supported by a piston 18 which is movable in the Z-direction. The piston 18 lowers the build bed 16 by a layer height each time a slice of the three-dimensional object 2 is completed. Moveable across the build bed surface 12 is a sled system 30, supporting particulate material distribution and processing equipment, in this implementation comprised within two sleds 32 and 34. One sled is a printing sled 32 supporting one or more droplet deposition heads and a radiation source assembly (not shown) such as those depicted in FIGS. 1a-c. The other sled is a distribution sled 34 comprising a particulate material distribution device 37, for example a roller or a blade. Each sled is moveable on a rail 36 across the build bed surface 12. Particulate material that has been dosed to the work surface 13 can be distributed across the build bed surface 12 by the distribution device 37 mounted on the distribution sled 34. Excess particulate material may be pushed into the return slot 426 by the distribution device 37 and returned to the dosing system 40 via the return tube 427. Once a layer of particulate material has been distributed over the build bed surface 12 by the distribution device 37, the printing sled 32 moves across the layer to allow the one or more droplet deposition heads to deposit radiation absorbing material (RAM), in accordance with image data. Next, the radiation source assembly (not shown) mounted on the printing sled 32 is used to irradiate the particulate material so as to consolidate the areas onto which RAM has been deposited. Next, the piston 18 lowers the build bed 16 by a layer thickness, and the process is repeated until the three-dimensional object 2 is fully built.

FIG. 2b is a schematic diagram of a cross-section through a portion of an apparatus 110 incorporating a radiation source assembly 101 similar to that depicted in FIG. 1b. The radiation source assembly 101 is mounted to the printing sled 32. The printing sled 32 may further comprise a droplet deposition head array 35 comprising one or more droplet deposition heads so as to span the build bed 16 in the Y-direction (into the page). The apparatus 110 for manufacturing a three-dimensional object accordingly comprises one or more droplet deposition heads which are operable to deposit a pattern of radiation-absorbing material (RAM) onto a layer of particulate material 71 on the build bed surface 12 in order to define the cross-section of the three dimensional object in said layer.

The droplet deposition head array 35 may be controlled by a printer controller 51 to deposit RAM in accordance with image data that may be supplied from an overall process controller 60 or that may be encoded in the printer controller 51. In operation, the printing sled 32 moves across the build bed surface 12 and the droplet deposition heads deposit a radiation absorbing material (RAM) so as to describe the shape of the relevant slice of the geometry of the three-dimensional object(s) to be formed, in accordance with image data. The layer of particulate material 71 is then irradiated using some or all of the radiation sources 21 in the radiation source array 19 in order to consolidate the regions of particulate material 71 that have had RAM deposited onto them. The radiation source array 19 may be controlled by a radiation system controller 53 which, in accordance with image data, enables individual radiation sources 21 to be activated in a controllable manner so as to switch them ON at the appropriate location, for an appropriate length of time and at an appropriate wavelength, focal length, spot size and intensity in order to achieve the desired consolidation effect. The radiation source assembly may be arranged so that the plurality of radiation sources are arranged into a plurality of individually addressable groups and sub-groups thereof with the radiation system controller 53 controlling the groups and sub-groups. Alternatively the entire build bed surface 12 may be irradiated if desired. In some implementations, it is preferable to irradiate substantially only the areas where RAM has been deposited, such that only the particulate material to which the RAM has been applied is consolidated. It may be understood that for some designs, and to prevent undesirable effects such as edge curl in the three-dimensional object being created, particulate material outside of the region on which the RAM was deposited may also be irradiated in a controlled manner so as to control the temperature gradient at the edge of the object, to ensure the object does not cool and solidify in situ and cause curl that could lead to catastrophic build failure. It may further be understood that a pre-heat step may be used to pre-heat selected portions of the build bed surface 12 and that this step may be performed by the radiation source assembly 100/101/102. The radiation source assembly 100/101/102 may be controlled by the radiation system controller 53.

Considering FIG. 2b further, a distribution sled 34 is located ahead of the printing sled 32 when viewed along the X-direction. The distribution sled 34 has a particulate material distribution device 37. In operation, the particulate material distribution device 37 acts to distribute the particulate material 70 evenly across the build bed surface 12 into a layer of particulate material 71 with controllable thickness. The particulate material distribution device 37 may be one or more of a roller and/or a blade or a combination of roller(s) and/or blade(s) or any other arrangement of devices suitable to distribute the particulate material across the build bed surface 12. The thickness of the layer of particulate material 71 will depend on the particulate material being used and on the distance by which the build bed 16 is being lowered ahead of distributing the particulate material. However, a typical layer thickness in a High Speed Sintering Machine may be around 50 µm-2mm; in some implementations, the layer thickness may be 80-100 µm.

The sleds 32, 34 may be controlled by a sled system controller 52 so as to control the speed and direction of travel of the sleds, and the timing of the movement of the sleds 32, 34 relative to each other.

FIG. 2b further shows that the radiation system controller 53 may be controlled by an overall process controller 60 that may also control the sled system controller 52 and the printer controller 51 so that all of the various process steps may be controlled and co-ordinated. The system may further comprise one or more temperature sensors 205. Such sensors 205 may, for example, be thermal cameras or pyrometers that monitor the temperature of the build bed surface 12 and provide feedback to the controller 60 to enable the process steps and the operation of the radiation source assembly 100/101/102, the sled system 30 and the droplet deposition head array 35 to be controlled and optimised. In this way, the desired temperature profile across the particulate material layer 71 may be maintained.

In FIG. 2b, the sensor 205 is located on the printing sled 32, but other suitable locations may be used, such as amongst the radiation sources 21, or at some suitable fixed location, such as above the build bed surface 12, or in any other suitable location where they are able to record the necessary data. The sensors 205 may optionally comprise an array of sensors 205 distributed suitably, for example at a number of locations above the build bed surface 12, so as to monitor the temperature of the smoothed particulate material 71 over some or all of the build bed surface 12. Alternatively an array of sensors 205 may be distributed over the printing sled 32, for example at the front and rear of the printing sled 32, so as to monitor the temperature of the particulate material layer 71 before and after irradiation. There may also be sensors 205 located before and after the printhead array 30, in the X-direction, so as to monitor any temperature changes due to liquid deposition in any printing step.

Figure 3A:
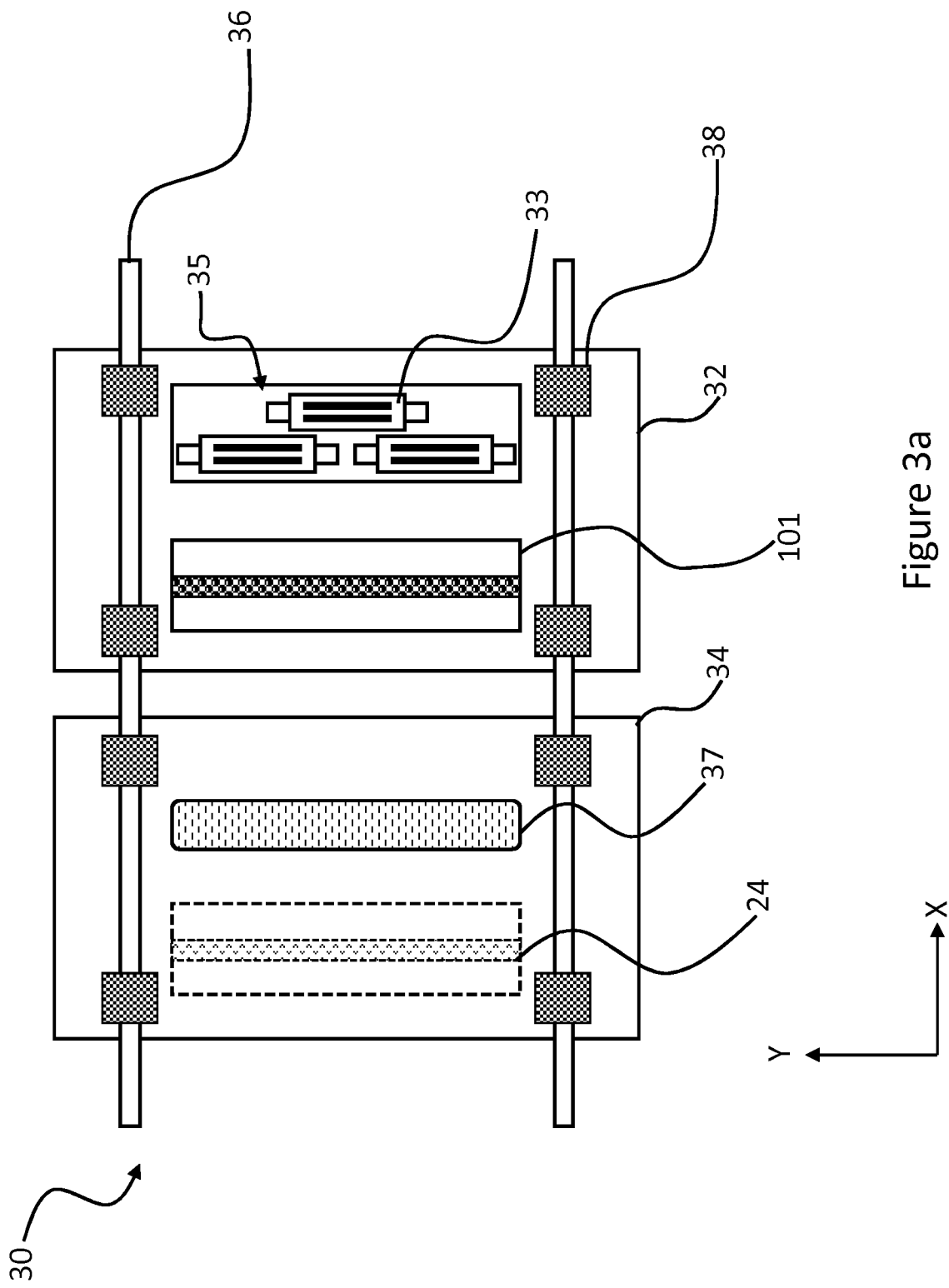
FIG. 3a is a schematic top view of two scanning sleds suitable for use in the apparatus depicted in FIGS. 2a and 2b.

Attention is now drawn to FIG. 3a, which is a schematic top view of a sled system 30 which may be used as part of the apparatus 110. In this implementation, the sled system 30 comprises a distribution sled 34 and a printing sled 32 arranged on bearings 38 on rails 36, with the printing sled 32 located ahead of the distribution sled 34 in the X-direction. The rails 36 act to suspend the sleds 32, 34 above a work surface 13 of the apparatus 110. In this implementation, the droplet deposition head array 35 comprises three droplet deposition heads 33 spanning the width of the build bed surface 12, in the Y-direction, in a staggered configuration, though this is by no means limiting and the number of droplet deposition heads 33 may be adjusted as necessary so as to span the width of any specific build bed surface 12 in the Y-direction. To ensure sufficient laydown of RAM there may be more than one row of droplet deposition heads 33 in the X-direction. The apparatus 110 may further comprise one or more pre-heaters 24 for pre-heating particulate material on the build bed surface 12 so that the one or more radiation source assemblies 101 is/are operable to consolidate particulate material on the build bed surface 12. It should be understood that whilst FIG. 3a depicts radiation source assembly 101, this is not limiting, and in other implementations radiation source assemblies 100 or 102 could be used as well/instead.

In the embodiment, depicted in FIG. 3a the pre-heater 24 is located on the distribution sled 34, though this is by no means limiting. Such a pre-heater 24 may be a halogen lamp, or a ceramic lamp, or a further radiation source assembly 100/101/102 or any other suitable heat source. In further implementations, the pre-heater may be a separate heater or heaters 29 located above the build bed surface 12, such as an overhead array of ceramic lamps, halogen lamps or LEDs. Still further, the pre-heater may comprise one or more sled-mounted pre-heaters 24 and one or more pre-heaters 29 located above the build bed surface 12. In implementations, where there are one or more separate pre-heaters 24/29, these may perform all of the pre-heat steps while the first one or more radiation source assemblies 100/101/102 may be used solely for consolidating particulate material on the build bed surface 12. In other implementations, the pre-heat step(s) may be shared between the one or more pre-heaters 24/29 and the radiation source assembly 100/101/102 in any manner suitable for achieving the desired temperatures in the particulate material layer 71 on the build bed surface 12.

Figure 3B:
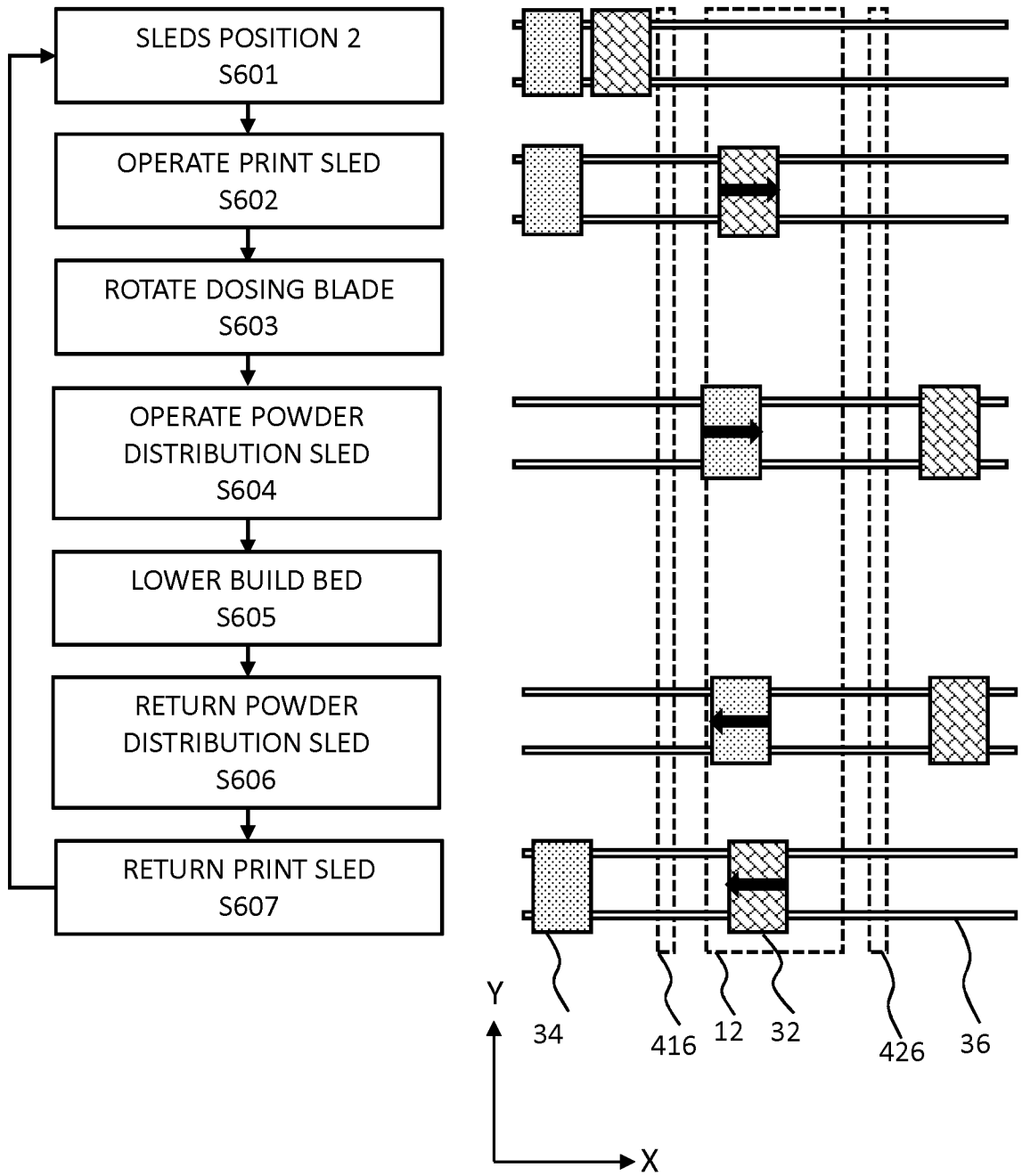

Turning now to FIG. 3b, this depicts a process for depositing RAM and consolidating particulate material using the sled layout as illustrated in FIG. 3a. The sleds 34, 32 start at sled position 2 at step S601, with both the distribution sled 34 and the printing sled 32 arranged behind the dosing device 416, such that the dosing device 416 is positioned between the sleds 34, 32 and the build bed surface 12. A first layer 71 of particulate material has already been distributed across the build bed surface 12 in a previous step.

At step S602, the printing sled 32 is moved in the X-direction from the side of the dosing device 416 across the build bed surface 12 to the side of the return slot 426. This is the printing sled 32 forward stroke. As the printing sled 32 moves across the build bed surface 12, the droplet deposition heads 33 deposit droplets 31, comprising RAM, in accordance with image data, onto the layer of particulate material 71. The droplet deposition heads 33 may be printheads and the deposition process may be a printing process. The droplets 31 may comprise a fluid comprising RAM, or a carrier fluid and a material comprising RAM, or any other suitable combination of liquids and/or materials such that RAM is deposited on the build bed surface 12 in accordance with image data. In other implementations, other suitable apparatus may be used instead of the droplet deposition heads 33, such that fluids and/or materials comprising RAM are delivered to the build bed surface. For example, the RAM could be a particulate material, such as a powder, and may be deposited by a coater arranged above the build bed 16.

As the printing sled 32 moves across the build bed surface 12, the radiation source assembly 101 which is mounted behind the droplet deposition heads 33 on the printing sled 32 (with respect to the X-direction of travel during step S602) consolidates the areas where RAM has been deposited. Once the printing sled 32 is clear of the dosing device 416 during step S602, or, if preferred, once the printing sled 32 has arrived at the opposite end of the work surface 13, at step S603, the dosing device 416 is operated to dose a fresh pile of particulate material 70 up to the level of the work surface 13 along the full length of the dosing device 416.

Next, at step S604 the distribution sled 34 is moved across the build bed surface 12 in the X-direction from the dosing device 416 side to the return slot 426 side—the distribution sled forward stroke. The distribution sled 34 passes over the dosing device 416, and the distribution device 37 spreads the pile of particulate material 70 across the work surface 13, distributing a layer 71 of particulate material on the build bed surface 12, before pushing any excess particulate material 70 down the return slot 426. The pre-heater 24 which is mounted on the distribution sled 34 behind the distribution device 37 (with respect to the direction of travel during step S604) optionally pre-heats the freshly distributed layer of particulate material 71.

At step S605, the floor of the build chamber 10 is lowered by the thickness of a layer of the object 2 using the piston 18.

At step S606, the distribution sled 34 is returned to the dosing device 416 side of the work surface 13—the distribution sled 34 return stroke. After that, and before RAM is deposited onto the fresh layer of particulate material 71, the floor of the build chamber 10 is raised. It may be raised to a level just short by the next layer thickness to be deposited with respect to the particulate material surface. The pre-heater 24 may optionally be utilised to help maintain the build bed surface 12 at a predetermined temperature.

Finally, at step S607, the printing sled 32 is returned to the dosing device 416 side of the work surface 13—the printing sled return stroke.

Optionally, during the printing sled return stroke, the radiation source assembly 101 may be used as a pre-heating source to help maintain the build bed surface 12 at a predetermined temperature. (FIG. 3a depicts radiation source assembly 101, but it should be understood that in other implementations radiation source assembly 100/102 may be used as well/instead.) The intensity and/or the wavelength of the radiation emitted by the radiation source assembly 100/101/102 may be adjustable for this function and/or the focal length of the one or more focusing lenses 23 (where present in the radiation source assembly) may be altered so as to alter the intensity of the focused beams 28 at the build bed surface 12 and/or to alter the spot size.

The process steps described above form one of many possible processes for the layer-by-layer formation of three-dimensional objects. It may be understood that the locations of the various components on the various sleds in the sled system 30 can be altered and suitable orders of process steps devised as would be apt therefor. Process steps may be added, removed or reordered as necessary in order to achieve the desired result. The process controller 60 and/or the printer controller 51 and/or the sled system controller 52 and/or the radiation system controller 53 may be used in any suitable manner to control the chosen process steps.

Figure 3C:
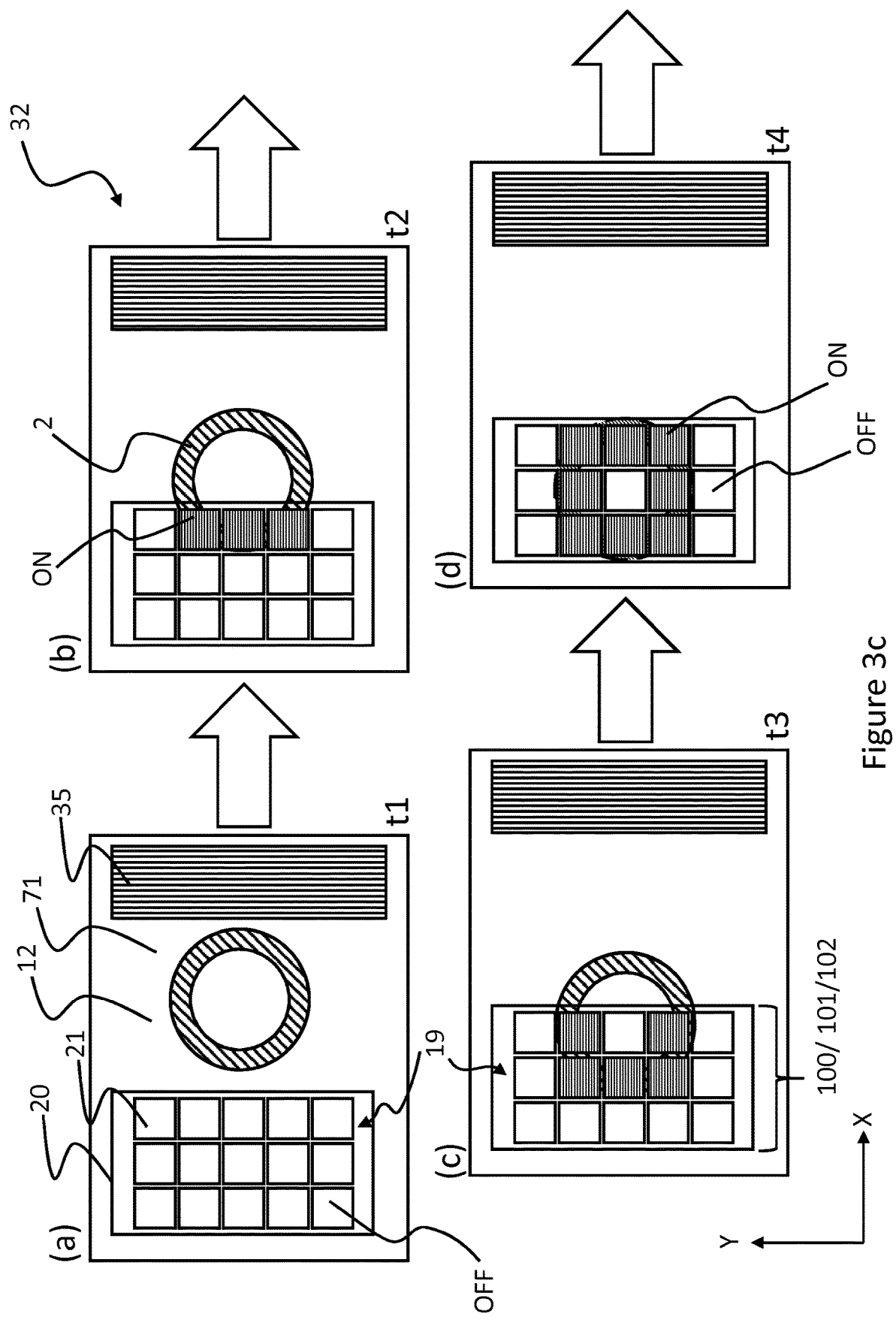
FIG. 3c is a schematic diagram of the printing sled at four time-steps during the process depicted in FIG. 3b.

Turning now to FIG. 3c, this is a schematic diagram of the printing sled 32 at four time-steps t1-t4 during the printing sled forward stroke S602 as it passes over the build bed surface 12. In FIG. 3c(a) at t1, the printing sled 32 comprising droplet deposition head array 35 has moved across the layer of particulate material 71 on the build bed surface 12 and the droplet deposition head array 35 has deposited radiation absorbing material (RAM) to form the next slice of the three dimensional object 2. In this time-step, the radiation source assembly 100/101/102 has not yet passed over the region of deposited RAM on the particulate material layer 71. In FIGS. 3c(b)-(d) the radiation source assembly 100/101/102 on the printing sled 32 moves over the build bed surface 12 so as to irradiate and consolidate the areas of particulate material layer 71 onto which RAM has been deposited to form a new slice of the three dimensional object 2.

It can be seen schematically from FIGS. 3c(b)-(d) that the individual radiation sources 21, indicated by squares, may be operated in a controllable manner so as to be switched ON (dark square) when they are above the area where RAM has been deposited to define the three dimensional object 2, and otherwise to be switched OFF (white squares). The length of time that each region of RAM on the build bed surface 12 is irradiated can therefore be carefully controlled, in accordance with the image data, so that all regions receive an appropriate amount of energy in order to be fully consolidated. This may prevent or reduce excessive heating of areas already consolidated, or reduce or eliminate heating of any regions where no RAM has been deposited.

To this end, for example, the radiation system controller 53 may be used to control the radiation source assembly 100/101/102 so as to control the duty cycle (duration of irradiation) and/or the level of power supplied to the radiation sources 21. The radiation sources 21 in the radiation source assembly 100/101/102 may be chosen so that they are operable to emit a plurality of wavelengths, and/or they are operable to emit radiation within an absorption band of wavelengths of the particulate material and/or of the radiation absorbing material (RAM) provided to the particulate material.

In some implementations of the radiation source assembly 100/101/102, the radiation source assembly 100/101/102 may comprise a first group of radiation sources 21 operable to emit radiation within an absorption band of wavelengths of the particulate material, and a second group of radiation sources 21 operable to emit radiation within an absorption band of wavelengths of radiation absorbing material (RAM) provided to the particulate material.

In some implementations, the radiation source assembly 100/101/102 may comprise radiation sources 21 whereby the wavelength(s) of the emitted radiation is/are selected for pre-heating particulate material on the build bed surface 12. Still further, in some implementations, the radiation source assembly 100/101/102 may comprise radiation sources 21 whereby the wavelength(s) of the emitted radiation is/are selected for consolidating particulate material on the build bed surface 12.

In some implementations, the wavelength(s) of the emitted radiation may be selected for both pre-heating and consolidating particulate material on the build bed surface 12. For example, the radiation source assembly 100/101/102 may comprise two types of LEDs that emit light at different ranges of wavelengths, one range suitable for pre-heating and one suitable for consolidation, where the two types of LEDs are arranged into first and second groups. The two groups may be further divided into a plurality of sub-groups, for example based on their location, such that they can be addressed and controlled. For example individual sub-groups may be turned ON/OFF in accordance with image and processing data. Alternatively a type of radiation source, such as an LED, that emits radiation over a broad range of wavelengths, suitable for both pre-heating and consolidation, may be chosen.

The particulate material may for example comprise powder, for example it may comprise polyamide (such as PA11, PA12, and PA6), polypropylene, polyurethane, other polymers, metals or ceramics. A suitable consolidation temperature for polyamide 12 (PA12), a commonly used powder in High Speed Sintering processes, may be >185° C., whereas a suitable consolidation temperature for polyamide 11 (PA11) may be >195° C. or possibly >200° C. Radiation suitable for consolidation may be in the IR or near IR spectrum and may have a wavelength of around 1 µm. The appropriate wavelength for consolidation will vary depending on the combination of particulate material and RAM used.

Figure 3D:
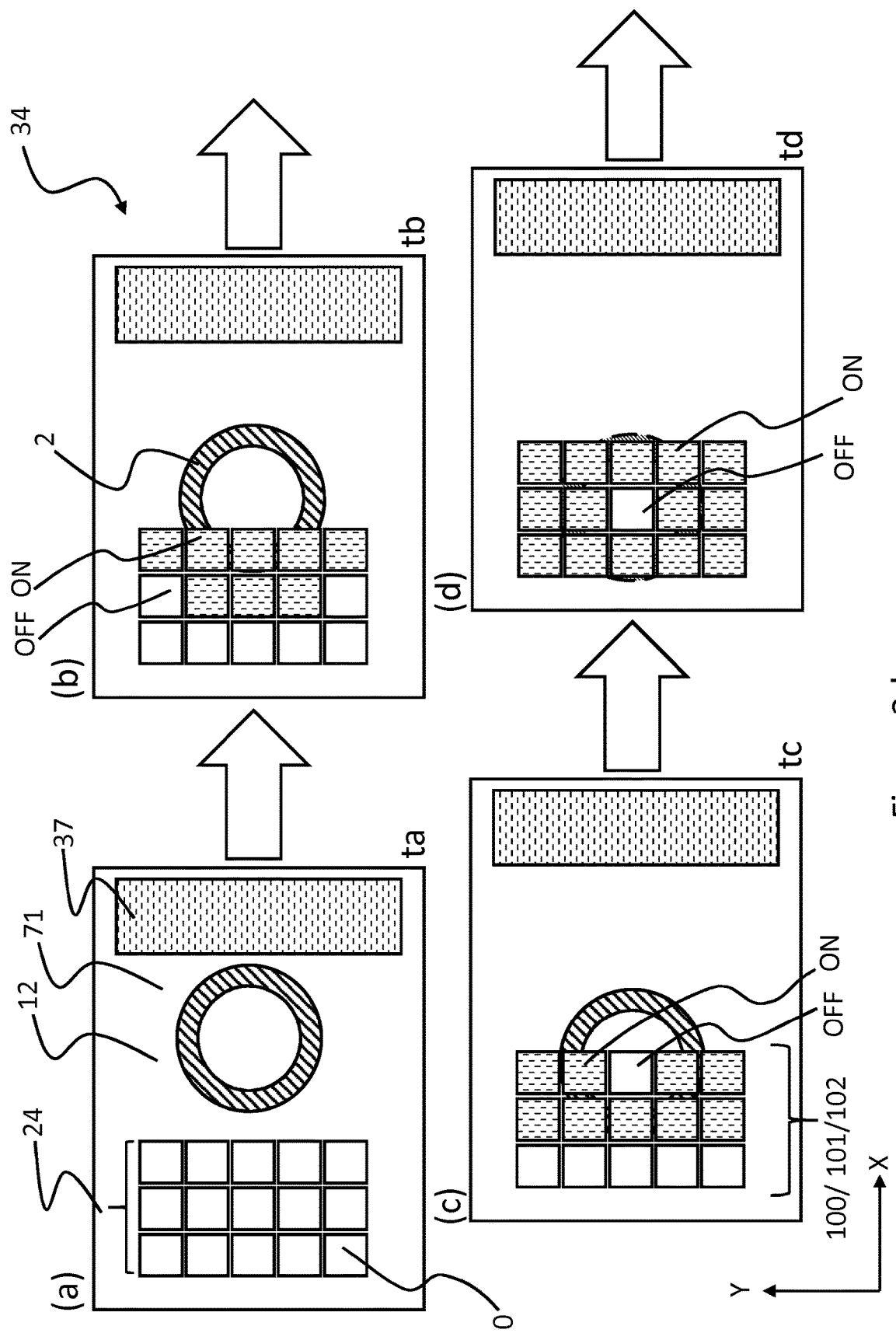
FIG. 3d is a schematic diagram of the distribution sled at four time-steps during the process depicted in FIG. 3b.

Considering now FIG. 3d, this is a schematic diagram of the distribution sled 34 at four time-steps ta-td during the distribution sled forward stroke S604, where the pre-heater 24 is an array of pre-heaters. In FIG. 3d (a), the distribution sled 34 has moved across the build bed surface 12 such that the distribution device 37 has distributed a layer of particulate material 71 across the build bed surface 12. In this time-step, the pre-heater 24 has not yet passed over the location of the slice of the three dimensional object 2. In FIGS. 3d(b)-(d), the pre-heater 24 located on the distribution sled 34 moves over the build bed surface 12 so as to irradiate and pre-heat the particulate material layer 71 in areas at and around the location of the slice of the three dimensional object 2. It may be desirable to pre-heat an area greater than that of the slice of the object 2 (as shown), so as to prevent undesirable effects such as curl due to cooling of edge parts leading to in situ solidification of the consolidated material. In other implementations, depending on the properties of the particulate material, and the desired temperature profiles across the build bed or build bed surface 12, the pre-heat step may be targeted to just the location of the three-dimensional object 2 in that particular slice of the object. In other implementations, it may be desirable to pre-heat all of the build bed surface 12, but with differing intensities of irradiation so as to maintain a desired temperature or temperature gradient across the build bed surface 12. This may be done, for example, to achieve improved properties of the three-dimensional object 2 by controlling the cooling rate after consolidation of a previous slice.

In some implementations, the wavelength of the radiation emitted from the radiation sources 21 may be selected for pre-heating particulate material 71 on the build bed surface 12. The desired pre-heat temperature depends on the particulate material being used, for example, a suitable pre-heat temperature range for PA12 is approximately 160-170° C.

In some implementations, the radiation sources 21 in the radiation source assembly 100/101/102 may be chosen such that the wavelength of the radiation emitted by the radiation sources 21 is selected for both pre-heating and consolidating particulate material on the build bed surface 12. The radiation sources may be light-emitting diodes (LEDs).

In some implementations, the radiation source assembly 100/101/102 may comprise radiation sources 21 which are laser diodes.

It may be understood that individual radiation sources 21 may be of a size that has been minimised so as to give fine granularity/per-pixel control of the region of the build bed surface 12 that they address when they are switched ON so as to consolidate and/or pre-heat particulate material 71 in a discrete region and enable formation of finely-featured objects 2. To this end, the use of a focusing lens or lenses 23 enables even greater control of the region which is addressed by the radiation beams 26 emitted from the individual radiation sources 21. The radiation source assembly may comprise one or more focusing lenses 23 which may comprise one or more cylindrical lenses. In other implementations, the radiation source assembly may comprise one or more focusing lenses 23 wherein the focusing lenses 23 may comprise one or more spherical lenses. The one or more focusing lenses may be arranged so each focusing lens is arranged to focus the beams 26 from a respective group of radiation sources 21, or a sub-group thereof. The focusing lenses 23 may be used in implementations where it is desirable to direct the beams to specific points or discrete regions for example so as to increase the energy at the build bed surface.

It may be understood that in some embodiments, as described with reference to FIG. 2b above, the apparatus 110 for manufacturing a three-dimensional object may comprise a first sled, distribution sled 34, comprising a pre-heat source, and a second sled, printing sled 32 comprising a consolidation source, wherein the consolidation source and the pre-heat source are each provided by one or more of said radiation source assemblies 100/101/102; or wherein the consolidation source is provided by said one or more radiation source assemblies 100/101/102 and the pre-heat source is provided by a (separate) pre-heater, such as pre-heater 24. In other implementations, the apparatus 110 for manufacturing a three-dimensional object may instead comprise a sled comprising a pre-heat source and a consolidation source; wherein the consolidation source and the pre-heat source are each provided by one or more of said radiation source assemblies 100/101/102; or wherein the consolidation source is provided by said one or more radiation source assemblies 100/101/102 and the pre-heat source is provided by a (separate) pre-heater, such as pre-heater 24.

The optional pre-heater 24 may then perform a pre-heat step to heat the particulate material layer 71 to a constant temperature. The pre-heating may be controlled by the radiation system controller 53, or the pre-heater may have its own separate controller. In some implementations, the pre-heater 24 may be a single heating source that spans the width of the build bed 16, in other implementations, it may comprise an array of heat sources comprising one or more rows of said heat sources. The pre-heater 24 may, for example, be one or more ceramic lamps; halogen lamps; infrared lamps or light-emitting diodes (LEDs) or laser diodes. In some implementations, the pre-heater 24 may be a radiation source assembly comprising a plurality of radiation sources 21(*i-vi*), each radiation source 21 being operable to emit a respective beam of radiation for pre-heating particulate material on a build bed surface 12 of the apparatus 110 for manufacturing a three-dimensional object; one or more collimators 22 arranged to collimate the beams 26 of radiation to produce a plurality of collimated beams 27; and optionally one or more focusing lenses 23 arranged to focus the collimated beams 27 to create focused beams 28 that are focused onto particulate material 71 on the build bed surface 12.

In some implementations, the pre-heater 24 may be replaced by a fixed heater 29 located above the build bed surface 12 (see FIG. 2a and FIG. 7) rather than being located on the distribution sled 34. Said fixed heater 29 may be operated dynamically during the build process, for example by comprising an array of heaters which can be individually controlled ON/OFF to address desired portions of the build bed surface in accordance with image data and process steps. In some implementations, there may be both a fixed heater 29 and one or more pre-heaters 24 mounted on one or more sleds. In still other implementations, the pre-heater 24 may be omitted and a pre-heat step may instead be performed by the radiation sources 21 in the radiation source array 19 on the printing sled 32. Said radiation sources 21 in the radiation source array 19 may be controllable to emit different levels of radiation such that they are able to emit lower levels of radiation in order to perform pre-heat steps as well as being able to emit levels of radiation sufficient to cause the particulate material to be consolidated. Such variability may be due to controllably emitting radiation at different intensities, or by being controllable to emit different types of radiation, e.g. radiation of different wavelengths, or by controlling the focusing lenses so as to alter the focal length of the beams and/or the spot size on the build bed surface.

The radiation source assembly 100/101/102 may comprise array(s) 19 of radiation sources 21 wherein the radiation sources 21 are able to emit a plurality of wavelengths. For example in some implementations, the radiation source assemblies 100/101/102 may comprise different types of radiation sources 21 which are suited to different purposes, for example some that are suitable for pre-heating and some that are suitable for consolidation. The different types of radiation sources 21 may be arranged in separate groups and sub-groups in different parts of the radiation source array 19, or they may be interleaved to form a multi-purpose radiation source array 19. In other implementations, the different types of radiation sources 21 may be split between two or more radiation source arrays 19 which may be located at different places within the apparatus 110.

The radiation source assembly 100/101/102 as described above can be used in a method for manufacturing a three-dimensional object 2 from a particulate material 71, whereby the method comprises depositing a radiation absorbing material (RAM) onto a layer of particulate material on a build bed surface, for example by moving one or more droplet deposition heads 33, possibly arranged in an array 35, across the build bed surface 12; and then consolidating the particulate material 71 in the layer where the RAM has been deposited by moving a radiation source assembly across the build bed surface. In alternative implementations the RAM may be delivered to the build bed surface 12 by any suitable method, using any suitable apparatus. In still further implementations the RAM may be mixed with the particulate material 71 prior to its distribution across the build bed surface 12; targeted heating in accordance with image data, using any of the embodiments and implementations described herein, then ensures that only the object 2 is consolidated.

Figure 4A:
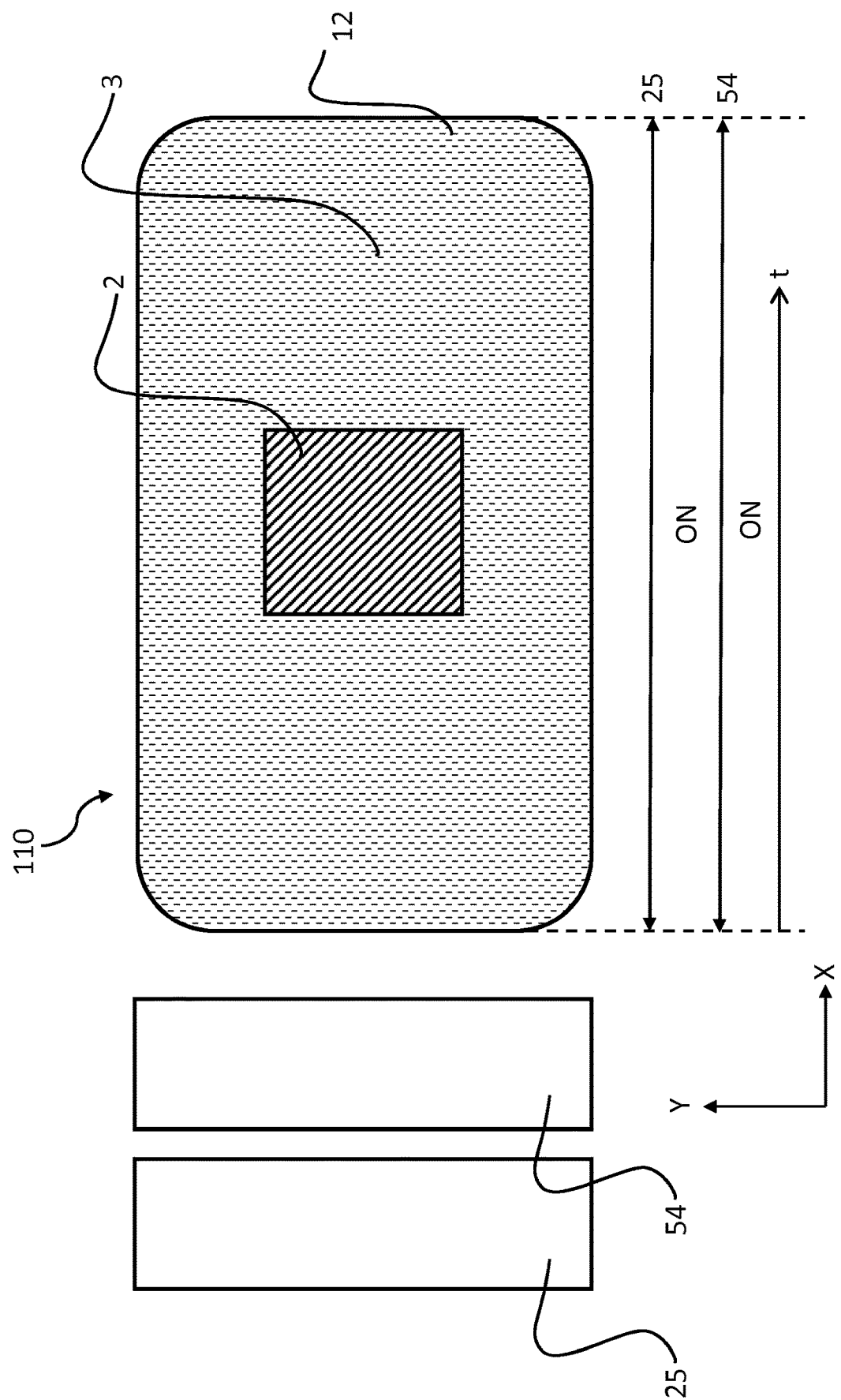
FIGS. 4a and 4b depict ways in which a radiation source (and optionally a pre-heater) for a test design for an apparatus for manufacturing a three-dimensional object can be operated in order to pre-heat or consolidate particulate material to form a slice of a three-dimensional object.
Figure 4B:
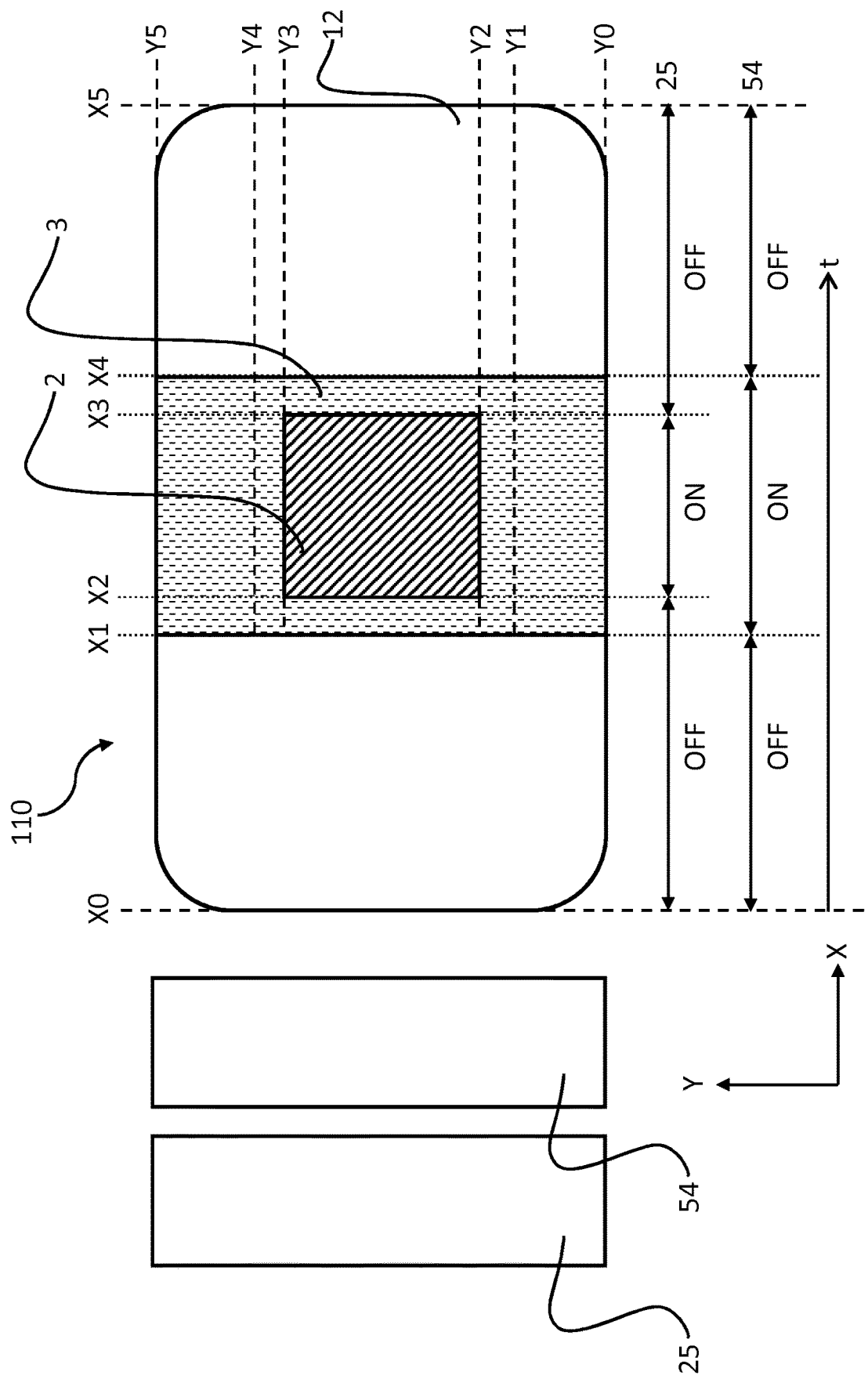

Attention is now drawn to FIGS. 4a and 4b, which depict a variety of ways in which a heater 25 (and optionally a pre-heater 54) for a test apparatus for manufacturing a three-dimensional object can be operated in order to pre-heat or consolidate particulate material to form a slice of an object 2. FIG. 4a depicts a pre-heater 54 and a heater 25 which can be moved across the build bed 16 in the X-direction in an arrangement similar to that widely used at present. Examples of such pre-heaters or heaters are one or more ceramic lamps; halogen lamps or infrared lamps. In this test example, which is not an embodiment, both the pre-heater 54 and the heater 25 span the width, in the Y-direction, of the build bed surface 12. Both are ON for the entire traverse over the build bed surface 12 so as to pre-heat all the particulate material and to consolidate the object 2 which has been defined by depositing RAM in accordance with image data. As previously discussed, such an arrangement is used because current heaters 25, and pre-heaters 54 take a considerable length of time to heat up to the desired temperatures, so cannot be effectively switched ON/OFF to heat only desired areas of the build bed surface 12. It is clear that whilst the slice of the three dimensional object 2 where the RAM has been deposited may be consolidated using the heater 25, the remainder of the particulate material 71 on the build bed surface 12 may receive undesirably excessive radiation which may lead to degradation of the particulate material, higher energy use and overall higher costs of production.

FIG. 4b depicts a similar arrangement of a test apparatus to FIG. 4a except that both the pre-heater 54 and the heater 25 are OFF for the majority of the traverse in the X-direction, apart from when they are respectively passing across the pre-heat region 3 and the three dimensional object 2 on the build bed surface 12. So the pre-heater 54 is OFF from X0 to X1, ON from X1 to X4 and then OFF from X4 to X5; whilst the heater 25 is OFF from X0 to X2, ON from X2 to X3 and then OFF from X3 to X5. It is clear that in the example given in FIG. 4b, less energy is supplied to the build bed surface 12 for both the pre-heat and the consolidation steps and the energy is more targeted in the X-direction at the region of interest. However, as for FIG. 4a, because both the pre-heater 54 and heater 25 span the build bed 16 in the Y-direction, there will be energy supplied to regions of the particulate material to either side of the three dimensional object 2 along the Y-direction, (between Y0 and Y1 and Y4 and Y5 for the pre-heater 54, and between Y0 and Y2 and Y3 and Y5 for the heater 25). Although only the area of the three dimensional object 2 has been defined by depositing RAM, and hence only this region will be consolidated, supplying energy to areas of the build bed surface 12 other than the location of the three dimensional object 2 and its surroundings for either pre-heat or consolidation may be undesirable as previously discussed.

Figure 5A:
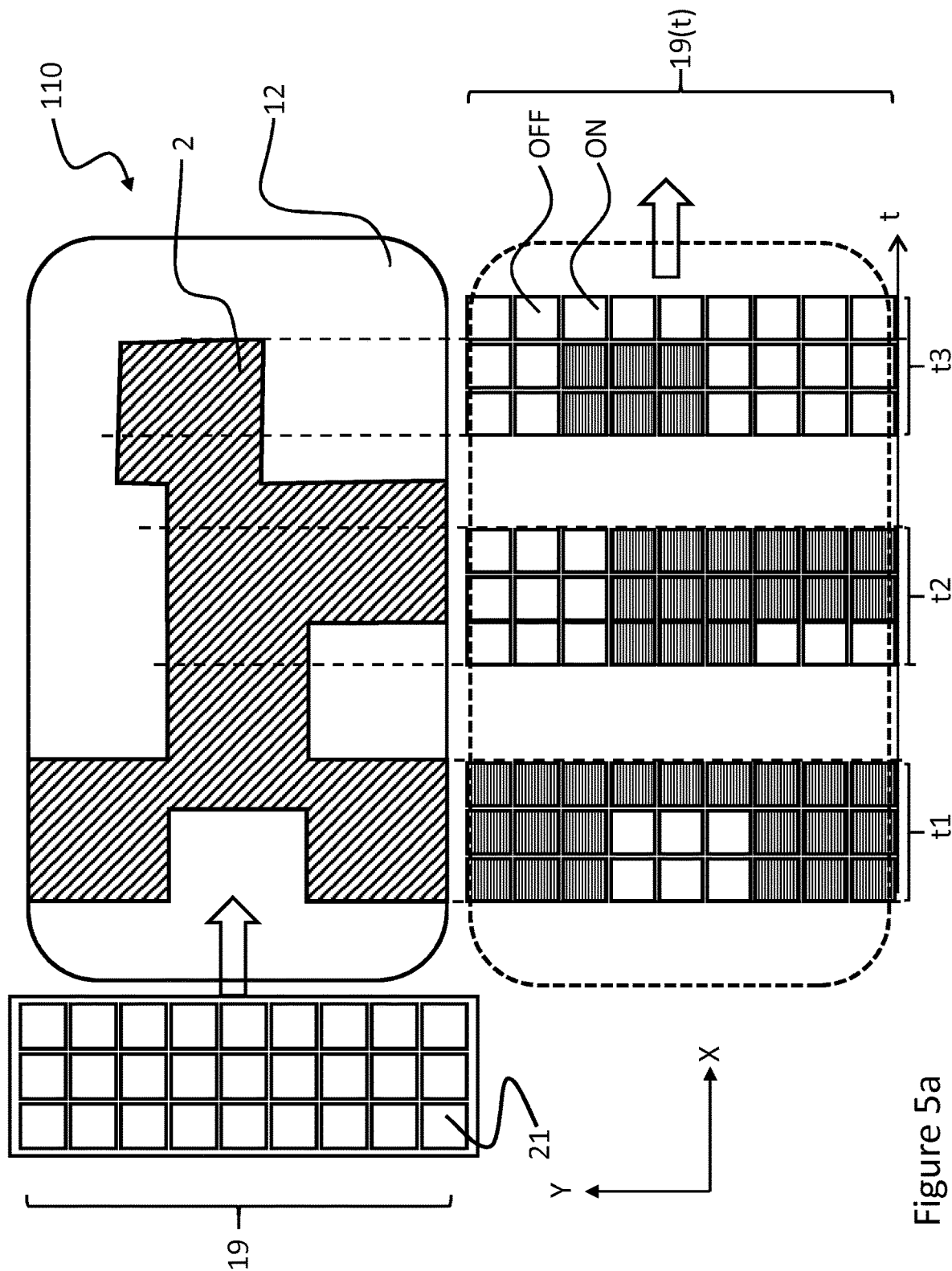
FIGS. 5a and 5b depict ways in which a radiation source assembly can be operated in a targeted manner in order to pre-heat or consolidate particulate material to form a slice of a three-dimensional object.
Figure 5B:
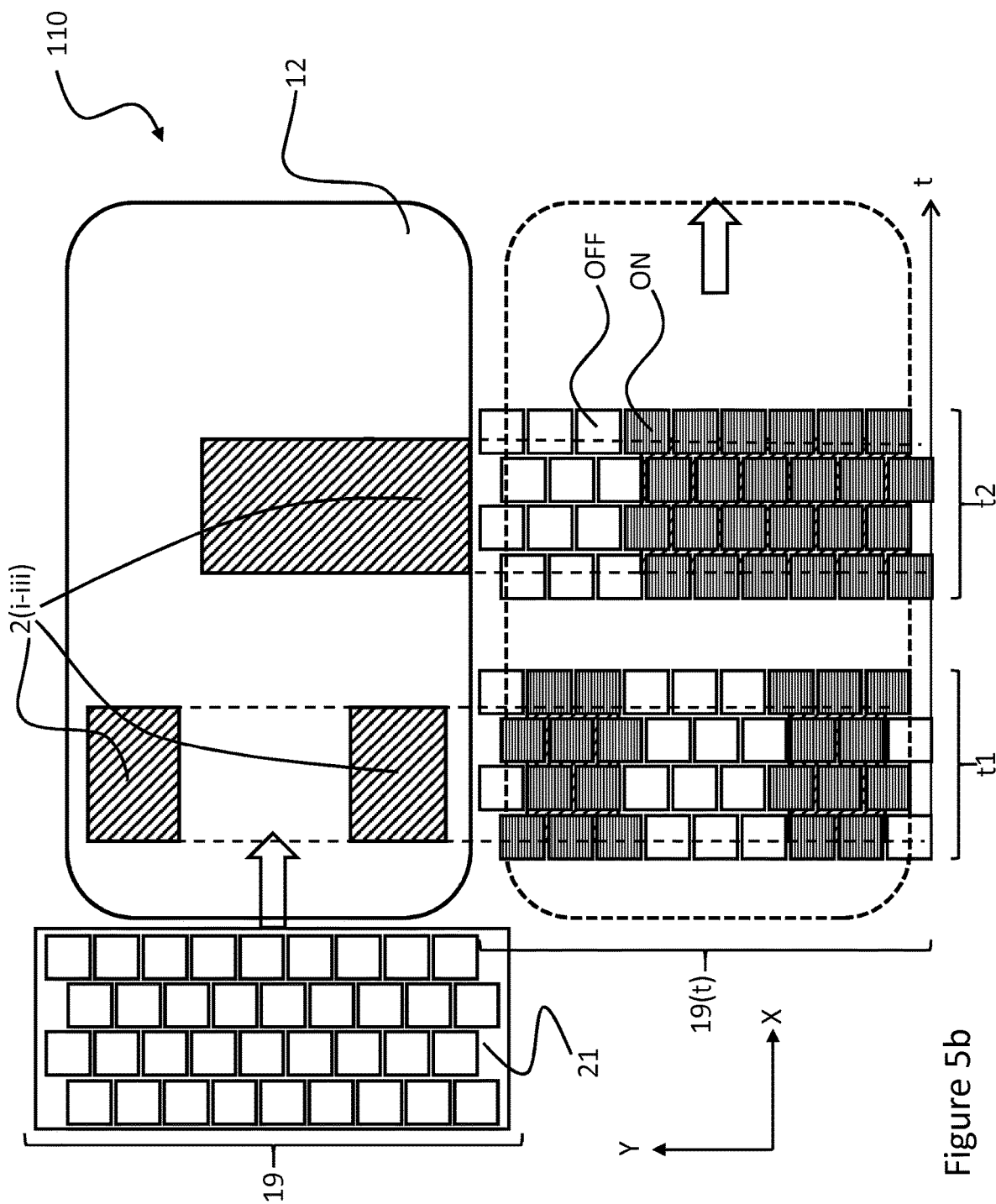

FIGS. 5a and 5b disclose embodiments aimed at reducing or preventing the above disadvantages of the test arrangements depicted in FIGS. 4a and 4b. Heater 25 has been replaced by a radiation source assembly 100/101 as depicted in FIG. 1a or 1b. Each of the individual radiation sources 21 in the radiation source array 19 can be controlled by a duty cycle such that they are switched ON when they pass above the slice of the three dimensional object 2(i-iii) to be consolidated and which has previously been defined with RAM. A method for operating the radiation source assembly 100/101 may therefore involve addressing and controlling individual radiation sources 21 within the plurality of radiation sources 21. For example such a method may involve one or more of controlling the intensity of the radiation being emitted and/or the wavelength(s) of the radiation being emitted and/or the spot size and/or the duty cycle of the plurality of radiation sources 21(i-vi).

For simplicity, the pre-heater 24 is omitted from FIGS. 5a and 5b, though it may be understood that it can be similarly arranged as an array of pre-heaters 24(i-n), possibly as a radiation source assembly 100/101 as depicted in FIGS. 1a and 1b respectively, with the individual pre-heaters 24 switched ON or OFF so as to pre-heat regions of the particulate material layer 71 on the build bed surface 12 as desired. In other implementations, the radiation source assembly 100/101 may be used to both pre-heat and consolidate the particulate material layer 71 on the build bed surface 12 by controlling individual radiation sources 21 or groups and/or sub-groups thereof so as to provide different levels of radiation depending on whether they are performing a pre-heat or consolidation step. This may be achieved by, for example, altering the radiation intensity, the power supplied to the radiation sources 21, the focal length of the beam of radiation, the spot size on the build bed surface, the wavelength being emitted, etc., in response to control signals from the radiation system controller 53 and the overall process controller 60.

Turning now to FIG. 5a, the embodiment depicted comprises a multi-row radiation source array 19 where individual radiation sources 21 are controlled in a duty cycle such that they are switched ON when they overlie the part of the three-dimensional object 2 that they are addressing and OFF elsewhere. The arrangement 19(t) of ON/OFF switching of the radiation sources 21 at three time instances t1 to t3 as the radiation source array 19 travels over the build bed surface 12 in the X-direction is shown.

Considering now FIG. 5b, this depicts a different multi-row radiation source array 19 where the rows of radiation sources 21 are staggered. This may be advantageous in some implementations to provide a higher resolution for the areas of radiation of the build bed surface. The arrangement 19(t) of ON/OFF radiation sources 21 at two time instances t1 and t2 in the duty cycle as the radiation source array 19 travels over the build bed surface 12 in the X-direction is shown. It may be understood that any suitable arrangement of staggered rows may be used, and that the embodiment depicted in FIG. 5b is merely a single non-limiting example. It may also be understood that for both the multi-row arrays 19 depicted in FIGS. 5a and 5b, the figures depict exemplary time instances and that in operation on a moving printing sled 32, individual radiation sources 21 may be operated in a duty cycle such that they are ON as they pass over the location of the slice of the three-dimensional object(s) 2 on the build bed surface 12 that has been defined with the radiation absorbing material (RAM) and OFF once they have passed over it. It may further be understood that the pre-heater 24 may be an array of pre-heaters 24(i-n) and may be arranged in either of the configurations depicted in FIGS. 5a and 5b and operated in a similar manner. In other implementations, it may be understood that the radiation sources 21 may be used for both a pre-heat step and a consolidation step, replacing or adding to the pre-heater(s) 24. As such an embodiment of the present disclosure may comprise an apparatus 110 for manufacturing a three-dimensional object 2 from a particulate material, the apparatus comprising: a work surface 13 which comprises a build bed surface 12; and one or more radiation source assemblies 100/101/102 as previously described, for pre-heating and/or consolidating particulate material 71 on the build bed surface 12.

Figure 6:
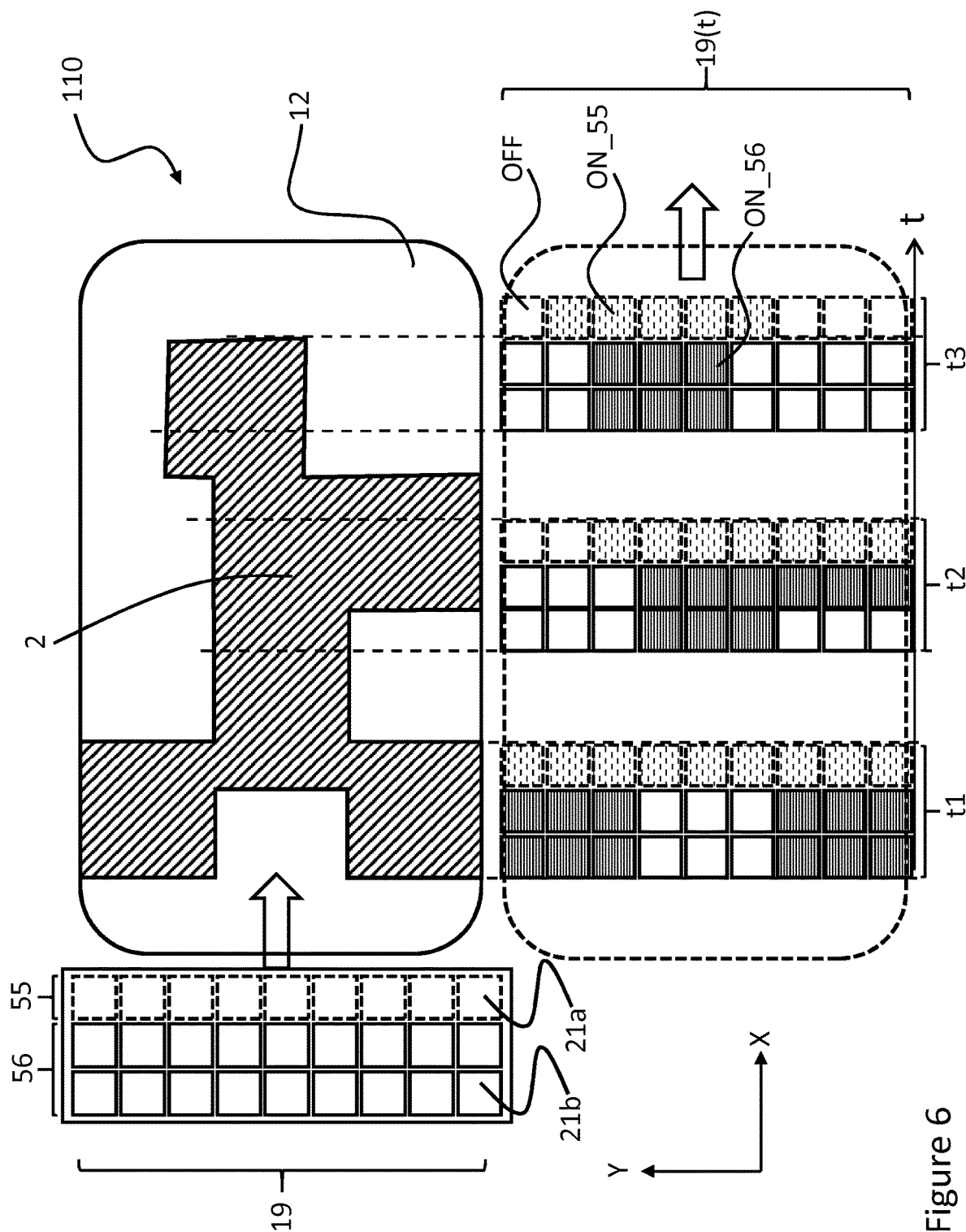
FIG. 6 depicts ways in which a radiation source assembly can be divided into two individually addressable groups and operated in a targeted manner in order to pre-heat or consolidate particulate material to form a slice of a three-dimensional object.

FIG. 6 depicts an embodiment similar to that in FIG. 5a where the radiation source array 19 has been divided into two separate groups 55 and 56. Group 55 comprises a row of radiation sources 21a that are suitable for pre-heating, distributed in the Y-direction so as to span the build bed 16. Group 56 comprises two rows of radiation sources 21b that are suitable for consolidation, distributed in the Y-direction so as to span the build bed 16. For example, the radiation sources 21a and 21b may be different types of LEDs. The arrangement 19(t) of ON/OFF switching of the radiation sources 21a/21b at three time instances t1 to t3 as the radiation source array 19 travels over the build bed surface 12 in the X-direction is shown. It can be seen that the pre-heat group 55 is controlled to irradiate a larger region than the slice of the three-dimensional object 2 (ON_55, dashed squares) and that the consolidation group 56 is controlled to address the slice of the three-dimensional object 2 that has been pre-defined with RAM (ON_56, solid squares). Within each group 55, 56, individual radiation sources 21a, 21b are controlled in a duty cycle such that they are switched ON when they overlie the part of the three-dimensional object 2 that they are addressing and OFF elsewhere.

In alternative implementations, the two groups 55, 56 may all comprise the same type of radiation source 21, but the spot size or focal length of the focused beams 28 may be controlled for each group so as to alter the intensity of the focused beam 28 at the build bed surface 12, or the first group 55 may be arranged with one or more collimators 22 to provide more diffuse heating at the build bed surface 12 and the second group 56 may be arranged with one or more collimators 22 and one or more focusing lenses 23 to provide more focused heating of the build bed surface 12. It may be understood that the arrangement of the two groups 55, 56 depicted in FIG. 6 is in no way limiting and that in alternative implementations there may be a plurality of groups, and sub-groups, which may be arranged in any suitable manner and separately controlled by any suitable method, as desired. Further the individual radiation sources in the plurality of groups and/or sub-groups may not be arranged in discrete rows as depicted in FIG. 6, but interleaved in a pattern, or arranged in alternate rows, or any other suitable layout.

A method for operating the radiation source assembly 100/101/102 may therefore comprise arranging the radiation sources 21 into a plurality of individually addressable groups, each group comprising one or more radiation sources 21. Further each group may comprise two or more radiation sources 21 and be divided into two or more sub-groups with each sub-group comprising one or more radiation sources 21. The method may further comprise controlling a group or sub-group of the radiation sources 21 to pre-heat selected portions of the particulate material 71 on the build bed surface 12. Additionally, the method may comprise controlling a group or sub-group of the radiation sources 21 to consolidate the particulate material on the build bed surface 12 that has been defined by deposition of a radiation absorbing material (RAM). The method may further involve the use of a radiation source assembly 21 that comprises one or more collimators 22 arranged to collimate the beams of radiation 26 emitted by the radiation sources 21 so as to produce a plurality of collimated beams 27. The method may further involve the use of a radiation source assembly that comprises one or more focusing lenses 23, and the method may further comprise controlling one or more focusing lenses 23 to focus the one or more collimated beams of radiation 27 onto the build bed surface 12. The method may comprise controlling the radiation source assembly 100/101/102 so as to switch a group or sub-group of the radiation sources ON or OFF as they move over the build bed surface 12. This may be in response to image data for the three-dimensional object 2, or in response to temperature measurements of the build bed surface 12 performed by one or more temperature sensors wherein the temperature at discrete regions is higher or lower than a desired temperature for pre-heating or consolidating the particulate material 71. The method of operation may further comprise controlling the radiation source assembly 100/101/102 so as to alter the amount of energy supplied to particulate material 71 at discrete regions on the build bed surface 12 by the radiation sources 21 in response to temperature measurements of the build bed surface 12 and information concerning the image data and desired temperatures.

Figure 7:
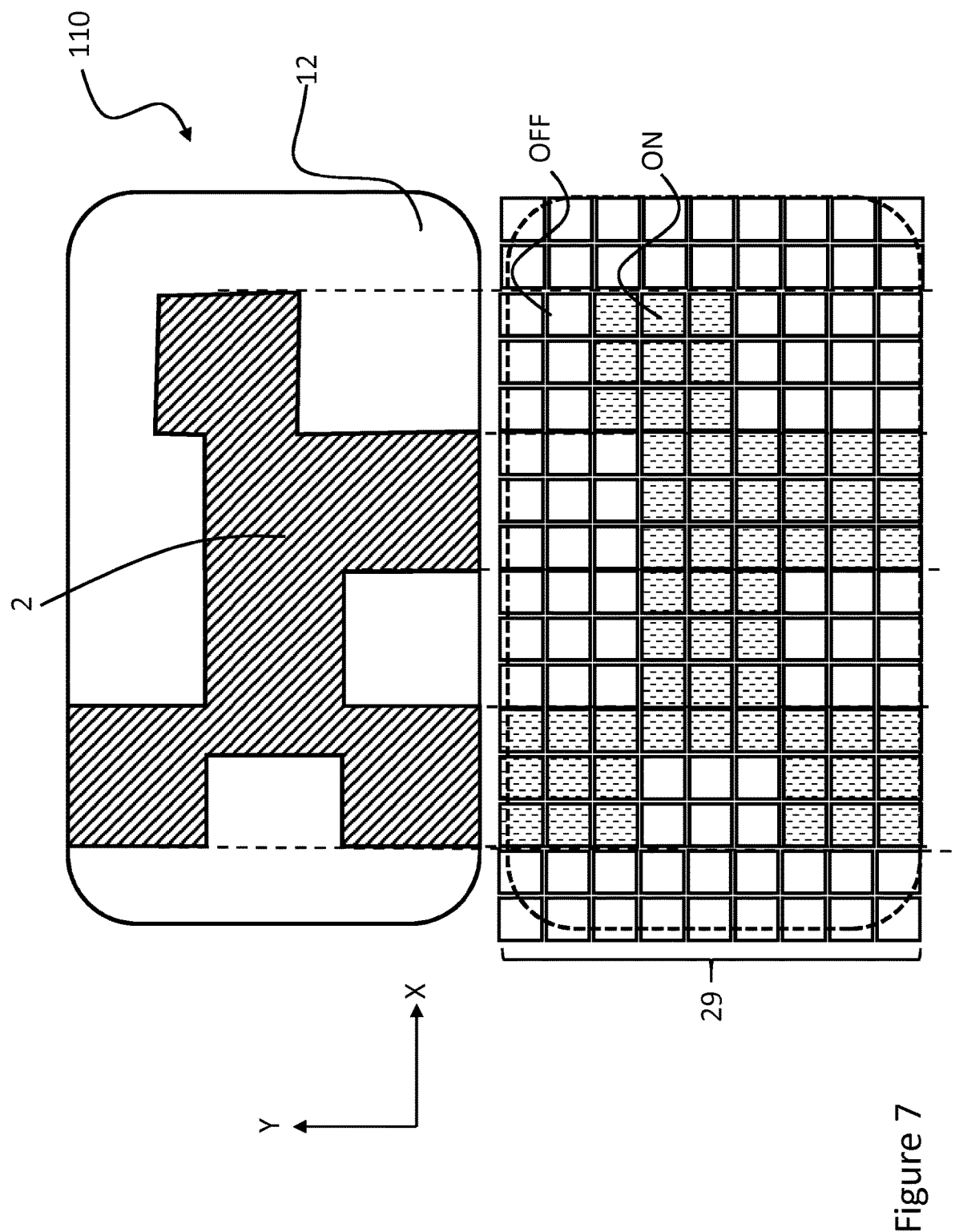
FIG. 7 depicts a way in which an overhead pre-heater can be operated in a targeted manner in order to pre-heat discrete regions of particulate material on the build bed surface.

Turning now to FIG. 7, this shows schematically an alternative arrangement for a pre-heat step where a fixed pre-heater array 29 located above the build bed surface 12, such as that depicted in FIG. 2*a*, is used instead of or in addition to a movable pre-heater array 24 located on a sled. A method of manufacturing a three-dimensional object 2 may further comprise using a pre-heater to controllably pre-heat selected portions of the particulate material on the build bed surface 12. Optionally, the pre-heater may be a pre-heater 24 such as radiation source assembly 100/101/ 102 as described herein and/or a fixed pre-heater array 29 located above the build bed surface. FIG. 7 depicts a build bed surface 12 and the ON/OFF arrangement of the pre-heater array 29, which may be radiation source assemblies 100/101, where each of the plurality of pre-heaters 29 can be individually addressed so as to controllably pre-heat required regions of the build bed surface 12 in accordance with the location of the slice of the object 2. An array of collimating lenses and/or an array of focusing lenses as depicted in FIGS. 1*a* and 1*b* may be used with the fixed pre-heater array 29 so as to collimate and/or focus the beams of radiation produced by the pre-heaters 29. The fixed pre-heaters 29 may comprise any suitable type of lamp or heater, and in some implementations may comprise radiation sources 21 as described herein, such as LEDs.

It will be understood by those skilled in the art that most radiation sources emit a range of wavelengths rather than a single wavelength, and that the above disclosure encompasses radiation sources that emit a range of wavelengths, where the radiation source may be chosen to have a desirable wavelength range or spectrum or band in order to be suitable for pre-heating and/or consolidating particulate material on a build bed surface. The term wavelength as used herein may therefore be understood to encompass radiation sources emitting a suitable range or spectra of wavelengths. References to a single wavelength may be understood to refer to a central wavelength within a distribution or range of wavelengths.

Further it should be understood that spot size can be measured using a number of techniques such as setting up the optical arrangement and exposing a light sensitive film, or using a CCD (charge coupled device) or digital camera. This would be part of a set up calibration procedure whereby the spot size can be fine-tuned by, for example, moving the relative positions of the collimators 22 and/or the focusing lenses 23 and/or by focusing or defocusing them. This could be part of a set up calibration procedure before running an apparatus for the layer-by-layer formation of three-dimensional (3D) objects.

It may be understood that any of the features described herein may be used in any combination and for any suitable purpose, with any of the other features described within the disclosure, as desired. For example a radiation source assembly 100 as per FIG. 1*a* may be used for a pre-heat step with a radiation source assembly as per FIG. 1*b* or FIG. 1*c* for a consolidation step.

The invention claimed is:

1. An apparatus for manufacturing a three-dimensional object from a particulate material, the apparatus comprising:
a piston configured to support a build bed of particulate material, the build bed having a build bed surface of particulate material;
a distribution sled comprising a particulate material distribution device for distributing each layer of particulate material across the build bed;
a printing sled comprising one or more droplet deposition heads operable to deposit a pattern of radiation-absorbing material (RAM) onto the layer, to define the cross-section of the three-dimensional object in said layer;
a pre-heat source arranged to move across the build bed surface so as to preheat said layer, and
a consolidation source arranged to move across the build bed surface so as to consolidate build material onto which RAM has been deposited while moving over the build bed surface;

wherein the pre-heat source and the consolidation source each span a width, in a direction orthogonal to the direction of movement, of the build bed surface; and one or more radiation source assemblies for pre-heating and/or for consolidating particulate material on the build bed surface, the or each radiation source assembly comprising:

a plurality of light-emitting diodes arranged in an array comprising a plurality of individually addressable groups, each light-emitting diode being operable to emit a respective beam of radiation towards the build bed surface; and one or more collimators, arranged to collimate the beams of radiation of the plurality of light-emitting diodes to produce one or more collimated beams of radiation, and to direct said collimated beams of radiation towards the particulate material on the build bed surface;

wherein at least one of the pre-heat source and the consolidation source comprises one of said radiation source assemblies; and wherein the apparatus is configured to move the distribution sled while distributing each layer, the pre-heat source while pre-heating, the printing sled while depositing RAM, and the consolidation source while consolidating, in the same direction.

2. The apparatus according to claim 1, further comprising a fixed pre-heater for pre-heating particulate material on the build bed surface, wherein said consolidation source comprises one of said one or more radiation source assemblies, wherein said fixed pre-heater comprises a fixed pre-heater array located above the build bed surface.

3. The apparatus according to claim 1, further comprising:
a first sled comprising the pre-heat source, the pre-heat source comprising a first radiation source assembly; and
a second sled comprising the consolidation source, the consolidation source comprising a second radiation source assembly.

4. The apparatus according to claim 3,
wherein said consolidation source comprises:
one or more focusing lenses arranged to focus the beams of radiation onto the particulate material on the build bed surface.

5. The apparatus according to claim 1, further comprising one or more focusing lenses arranged to focus the collimated beams of radiation onto the particulate material on the build bed surface, wherein said one or more collimators are arranged between the plurality of light-emitting diodes and the focusing lenses.

6. The apparatus according to claim 5, wherein the distance of the one or more focusing lenses from the build bed surface is adjustable.

7. The apparatus according to claim 1, wherein the distance of the light-emitting diodes from the build bed surface is adjustable; and/or
the distance of the one or more collimators from the build bed surface is adjustable.

8. The apparatus according to claim 1, wherein the plurality of light-emitting diodes comprises:
a first group of light-emitting diodes operable to emit radiation within an absorption band of wavelengths of the particulate material so as to preheat, and
a second group of light-emitting diodes operable to emit radiation within an absorption band of wavelengths of the RAM so as to consolidate the particulate material to which the RAM has been provided.

9. The apparatus according to claim 1, further comprising one or more temperature sensors configured to measure the temperature of the build bed surface, wherein the one or more radiation source assemblies are configured to be operable in response to temperature measurements by the one or more temperature sensors.

10. A method for manufacturing a three-dimensional object from a particulate material in an apparatus for manufacturing the three-dimensional object from particulate material, the apparatus comprising a build bed surface of particulate material, and one or more radiation source assemblies for pre-heating and/or for consolidating particulate material on the build bed surface, the or each radiation source assembly comprising:

a plurality of light-emitting diodes arranged in an array spanning the width of the build bed surface and comprising a plurality of individually addressable groups, each light-emitting diode being operable to emit a respective beam of radiation towards the build bed surface; and one or more collimators, arranged to collimate the beams of radiation of the plurality of light-emitting diodes to produce one or more collimated beams of radiation, and to direct said collimated beams of radiation towards the particulate material on the build bed surface;

wherein the method comprises at least one of the steps of:
moving the radiation source assembly across the build bed surface while operating one or more of the plurality of light-emitting diodes so as to preheat the particulate material; and/or depositing a radiation absorbent material (RAM) onto a layer of particulate material on the build bed surface by moving one or more droplet deposition heads across the build bed surface; and/or consolidating the particulate material in the layer where the RAM has been deposited by moving the or a further radiation source assembly across the build bed surface while operating one or more of the plurality of light-emitting diodes.

11. The method according to claim 10, further comprising individually addressing and controlling the plurality of light-emitting diodes while moving them across the build bed surface.

12. The method according to claim 10, further comprising controlling one or more of the intensity of the radiation being emitted and/or the wavelength of the radiation being emitted and/or the duty cycle of said plurality of light-emitting diodes.

13. The method according to claim 10, wherein the one or more radiation source assemblies further comprises one or more focusing lenses arranged to focus the collimated beams of radiation onto the particulate material on the build bed surface, and wherein said one or more collimators are arranged between the plurality of light-emitting diodes and the focusing lenses, the method further comprising adjusting the focal length(s) and/or the spot size of said one or more focusing lenses.

14. The method according to claim 10, wherein the plurality of light-emitting diodes of the radiation source assembly are arranged into a plurality of individually addressable groups, each group comprising one or more of the light-emitting diodes, the method further comprising moving the radiation source assembly across the build bed surface while operating a group of the one or more groups of light-emitting diodes to carry out the step of pre-heating by pre-heating selected portions of the particulate material on the build bed surface.

15. The method according to claim 14, comprising the step of depositing the RAM onto the layer of particulate material on the build bed surface by moving the one or more droplet deposition heads across the build bed surface, and
consolidating the particulate material in the layer where the RAM has been deposited, the method further comprising moving the radiation source assembly across the build bed surface while operating a further group of the one or more groups of the light-emitting diodes to carry out the step of consolidating the particulate material on the build bed surface that has been defined by deposition of the RAM.

16. The method according to claim 14, further comprising controlling whether a group or sub-group of the light-emitting diodes is switched ON or OFF as they are moved over the build bed surface.

17. The method according to claim 10, wherein the apparatus further comprises one or more temperature sensors arranged to monitor the temperature of the build bed surface, the method further comprising controlling the radiation source assembly so as to alter the energy supplied to selected portions of the particulate material on the build bed surface in response to temperature measurements performed by the one or more temperature sensors.

18. A method for manufacturing a three-dimensional object from a particulate material in an apparatus for manufacturing the three-dimensional object from particulate material, the apparatus comprising a build bed surface of particulate material, and a fixed pre-heater array located above the build bed surface, the fixed pre-heater array comprising one or more radiation source assemblies for pre-heating particulate material on the build bed surface, the or each radiation source assembly comprising:
- a plurality of light-emitting diodes comprising a plurality of individually addressable groups arranged in an array, each light-emitting diode being operable to emit a respective beam of radiation towards the build bed surface; and
- one or more collimators, arranged to collimate the beams of radiation of the plurality of light-emitting diodes to produce one or more collimated beams of radiation, and to direct said collimated beams of radiation towards the particulate material on the build bed surface;
- wherein the method comprises controllably pre-heating one or more selected portions of the particulate material on the build bed surface using the fixed pre-heater array.

* * * * *